US012413024B2

(12) United States Patent
Kim et al.

(10) Patent No.: US 12,413,024 B2
(45) Date of Patent: Sep. 9, 2025

(54) SUBSTRATE CONNECTOR

(71) Applicant: LS MTRON LTD., Anyang-si (KR)

(72) Inventors: Dong Wan Kim, Anyang-si (KR); Sang Jun Oh, Anyang-si (KR); Hyun Joo Hwang, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 336 days.

(21) Appl. No.: 18/023,992

(22) PCT Filed: Jul. 29, 2021

(86) PCT No.: PCT/KR2021/009889
§ 371 (c)(1),
(2) Date: Feb. 28, 2023

(87) PCT Pub. No.: WO2022/045603
PCT Pub. Date: Mar. 3, 2022

(65) Prior Publication Data

US 2023/0268694 A1 Aug. 24, 2023

(30) Foreign Application Priority Data

Aug. 28, 2020 (KR) ........................ 10-2020-0108965
Jul. 21, 2021 (KR) ........................ 10-2021-0095753

(51) Int. Cl.
*H01R 12/50* (2011.01)
*H01R 12/71* (2011.01)
(Continued)

(52) U.S. Cl.
CPC ....... *H01R 13/6583* (2013.01); *H01R 12/716* (2013.01); *H01R 13/652* (2013.01)

(58) Field of Classification Search
CPC ............. H01R 13/6583; H01R 12/716; H01R 13/652; H01R 12/57; H01R 13/6471; H01R 12/73; H01R 13/6585; H01R 13/6594
See application file for complete search history.

(56) References Cited

U.S. PATENT DOCUMENTS 5,718,592 A * 2/1998 Hosler, Sr. ........... H01R 12/716 439/83
7,086,866 B1 * 8/2006 Folan .................. H01R 12/716 439/954
(Continued)

FOREIGN PATENT DOCUMENTS

JP 10069950 A 3/1998
JP 2018101559 A 6/2018
(Continued)

OTHER PUBLICATIONS

International Search Report for related International Application No. PCT/KR2021/009889; action dated Mar. 3, 2022; (5 pages).
(Continued)

*Primary Examiner* — Abdullah A Riyami
*Assistant Examiner* — Nelson R. Burgos-Guntin
(74) *Attorney, Agent, or Firm* — K&L Gates LLP

(57) ABSTRACT

The present disclosure relates to a substrate connector comprising a plurality of radio frequency (RF) contacts for RF signal transmission; an insulation unit for supporting the RF contacts; a plurality of transmission contacts coupled to the insulation unit between a first RF contact and a second RF contact so the first RF contact of the RF contacts and the second RF contact of the RF contacts are spaced from each other in a first axial direction; a ground housing to which the insulation unit is coupled; a first ground contact which is coupled to the insulation unit; and a second ground contact which is coupled to the insulation unit, wherein the first RF
(Continued)

contact includes a first RF inspection plane with which an inspection instrument is to come in contact, and the second RF contact includes a second inspection plane with which the inspection instrument is to come in contact.

19 Claims, 21 Drawing Sheets

(51) Int. Cl.
*H01R 13/652* (2006.01)
*H01R 13/6583* (2011.01)

(56) References Cited

U.S. PATENT DOCUMENTS

| | | | | |
|---|---|---|---|---|
| 7,198,492 | B2 * | 4/2007 | Shichida | H01R 24/50 439/74 |
| 9,065,228 | B2 * | 6/2015 | Nishimura | H01R 13/6594 |
| 2006/0141811 | A1 * | 6/2006 | Shichida | H01R 24/50 439/63 |
| 2014/0287628 | A1 | 9/2014 | Zhang et al. | |
| 2017/0265322 | A1 * | 9/2017 | Son | H01R 12/716 |
| 2018/0151967 | A1 * | 5/2018 | Chen | H01R 12/57 |
| 2019/0214772 | A1 * | 7/2019 | Kodama | H01R 13/6582 |
| 2019/0280439 | A1 * | 9/2019 | Ni | H01R 13/2421 |

FOREIGN PATENT DOCUMENTS

| | | | |
|---|---|---|---|
| JP | 20200123438 | A | 8/2020 |
| KR | 1020170015125 | A | 2/2017 |
| KR | 1020170129066 | A | 11/2017 |
| KR | 1020200041188 | A | 4/2020 |
| WO | 2020003731 | A1 | 1/2020 |
| WO | 2020123438 | A1 | 6/2020 |

OTHER PUBLICATIONS

Written Opinion for related International Application No. PCT/KR2021/009889; action dated Mar. 3, 2022; (8 pages).
Office Action for related Japanese Application No. 2023-513875; action dated Feb. 20, 2024; (3 pages).

* cited by examiner

200

300

SUBSTRATE CONNECTOR

CROSS-REFERENCE TO RELATED APPLICATION

The present application is a National Stage of International Application No. PCT/KR2021/009889 filed on Jul. 29, 2021, which claims priority to and the benefit of Korean Utility Model Application No. 10-2020-0108965, filed on Aug. 28, 2020; and Korean Utility Model Application No. 10-2021-0095753, filed Jul. 21, 2021 the disclosures of which are incorporated herein by reference in their entirety.

FIELD

The present disclosure relates to a substrate connector which is installed in an electronic device for electrical connection between substrates.

BACKGROUND

A connector is provided in various electronic devices for electrical connection. For example, the connector is installed in an electronic device such as a mobile phone, a computer, a tablet computer and the like such that various parts installed in the electronic device can be electrically connected to each other.

In general, among electronic devices, an RF connector and a board-to-board connector (hereinafter, referred to as a 'substrate connector') are provided inside wireless communication devices such as smart phones, tablet PCs and the like. The RF connector transmits a radio frequency (RF) signal. The substrate connector processes digital signals such as cameras.

Such RF connectors and substrate connectors are mounted on a printed circuit board (PCB). Conventionally, since several substrate connectors and RF connectors are mounted together with a large number of components in a limited PCB space, there is a problem in that the PCB mounting area becomes large. Accordingly, in accordance with the trend of miniaturization of smartphones, there is a need for a technique for optimizing a small PCB mounting area by integrating an RF connector and a substrate connector.

FIG. 1 is a schematic perspective view of a substrate connector according to the related art.

Referring to FIG. 1, a substrate connector 100 according to the related art includes a first connector 110 and a second connector 120.

The first connector 110 is to be coupled to a first substrate (not illustrated). The first connector 110 may be electrically connected to the second connector 120 through a plurality of first contacts 111.

The second connector 120 is to be coupled to a second substrate (not illustrated). The second connector 120 may be electrically connected to the first connector 110 through a plurality of second contacts 121.

The substrate connector 100 according to the related art may electrically connect the first substrate and the second substrate to each other as the first contacts 111 and the second contacts 121 are connected to each other. In addition, when some contacts among the first contacts 111 and the second contacts 121 are used as RF contacts for RF signal transmission, the substrate connector 100 according to the related art may be implemented such that an RF signal is transmitted between the first substrate and the second substrate through the RF contact.

Herein, the substrate connector 100 according to the related art has the following problems.

First, in the substrate connector 100 according to the related art, when using contacts that are spaced apart by a relatively short distance among the contacts 111, 121 as the RF contacts, there is a problem in that signal transmission is not performed smoothly between the RF contacts 111', 111", 121', 121" due to RF signal interference.

Second, since the substrate connector 100 according to the related art has an RF signal shielding part 112 in the outermost part of the connector, radiation to the outside of the RF signal can be shielded, but the shielding between the RF signals is not performed.

Third, in the substrate connector 100 according to the related art, the RF contacts 111', 111", 121', 121" include mounting parts **111*a*', 111*a*", 121*a*', 121*a*" mounted on the substrate, respectively, and the mounting parts 111*a*', 111*a*", 121*a*', 121*a*" are disposed to be exposed to the outside. Accordingly, the substrate connector 100 according to the related art has a problem in that the shielding for the mounting parts 111*a*', 111*a*", 121*a*', 121*a*"** is not performed.

SUMMARY

The present disclosure has been devised to solve the above-described problems, and an object of the present disclosure to provide a substrate connector which is capable of reducing the possibility of generating RF signal interference between RF contacts.

In order to solve the above problems, the present disclosure may include the following configurations.

The substrate connector according to the present disclosure may include a plurality of radio frequency (RF) contacts for RF signal transmission; an insulation unit for supporting the RF contacts; a plurality of transmission contacts coupled to the insulation unit between a first RF contact and a second RF contact such that the first RF contact of the RF contacts and the second RF contact of the RF contacts are spaced apart from each other in a first axial direction; a ground housing to which the insulation unit is coupled; a first ground contact which is coupled to the insulation unit and shields the gap between the first RF contact and the transmission contacts on the basis of the first axial direction; and a second ground contact which is coupled to the insulation unit and shields the gap between the second RF contact and the transmission contacts on the basis of the first axial direction. The first RF contact may include a first RF inspection plane with which an inspection instrument is to come in contact. The second RF contact may include a second inspection plane with which the inspection instrument is to come in contact. The first RF inspection plane and the second RF inspection plane may be arranged on a plane having the same height.

According to the present disclosure, the following effects can be achieved.

The present disclosure can implement a shielding function of signals, electromagnetic waves and the like for RF contacts by using the grounding housing. Accordingly, the present disclosure can prevent electromagnetic waves generated from RF contacts from interfering with signals of circuit components located in the vicinity of the electronic device, and can prevent electromagnetic waves generated from circuit components located in the vicinity of the electronic device from interfering with signals transmitted by the RF contacts. Therefore, the present disclosure can contribute to improving EMI (Electro Magnetic Interference) shielding performance and EMC (Electro Magnetic Compatibility) performance by using the grounding housing.

The present disclosure may be implemented such that all of the RF contacts including the portion mounted on a substrate are located inside the ground housing. Accordingly, the present disclosure can implement complete shielding by reinforcing the shielding function for RF contacts by using the grounding housing.

The present disclosure is implemented such that an area for contacting an inspection instrument can be secured, thereby improving the ease and accuracy of contact with the inspection instrument. Accordingly, the present disclosure can improve the accuracy of the inspection results by using an inspection instrument.

In the present disclosure, since the surface to which the inspection instrument is in contact is formed as a flat surface, it is possible to prevent slip or the like from occurring in the process of contacting the inspection instrument. Therefore, the present disclosure can improve the contact reliability for the inspection instrument.

DETAILED DESCRIPTION

Figure 14:
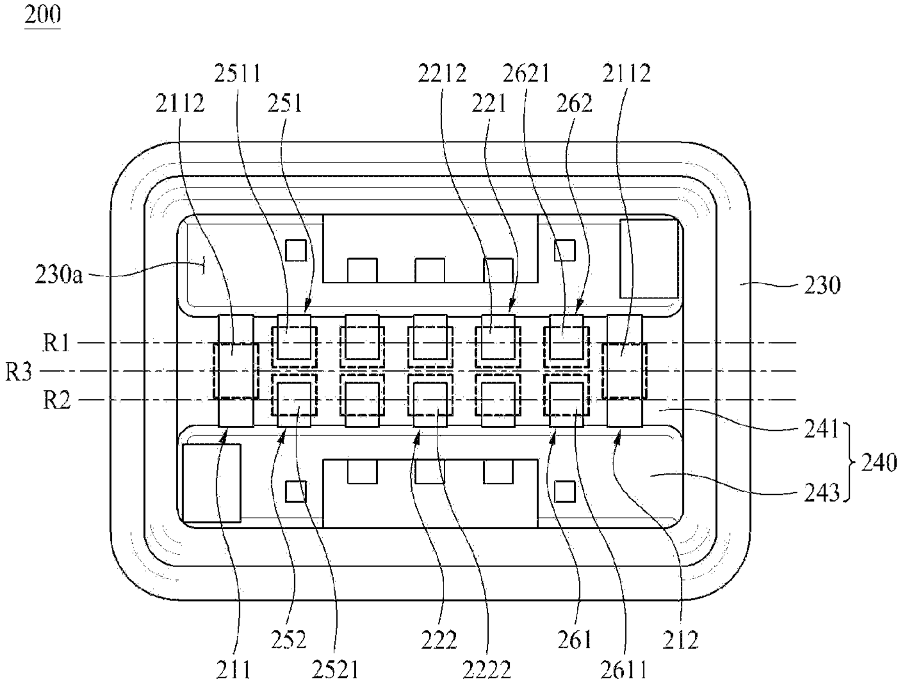
FIG. 14 is a schematic plan view showing a modified exemplary embodiment of the arrangement of contacts in the substrate connector according to the first example.
Figure 16:
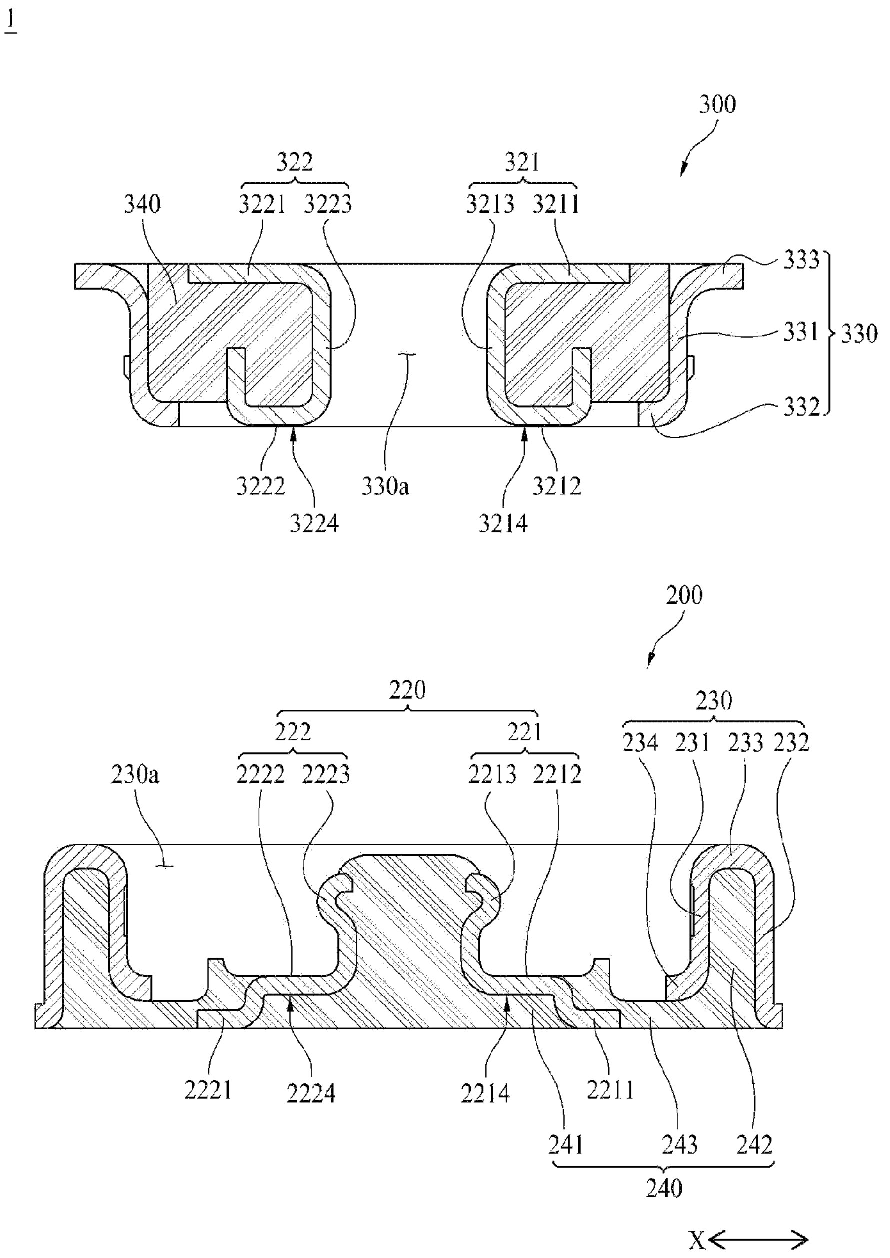
FIG. 16 is a schematic side cross-sectional view showing a state in which the substrate connector according to the first example and the substrate connector according to the second example are spaced apart from each other for coupling based on the line A-A of FIG. 15.
Figure 17:
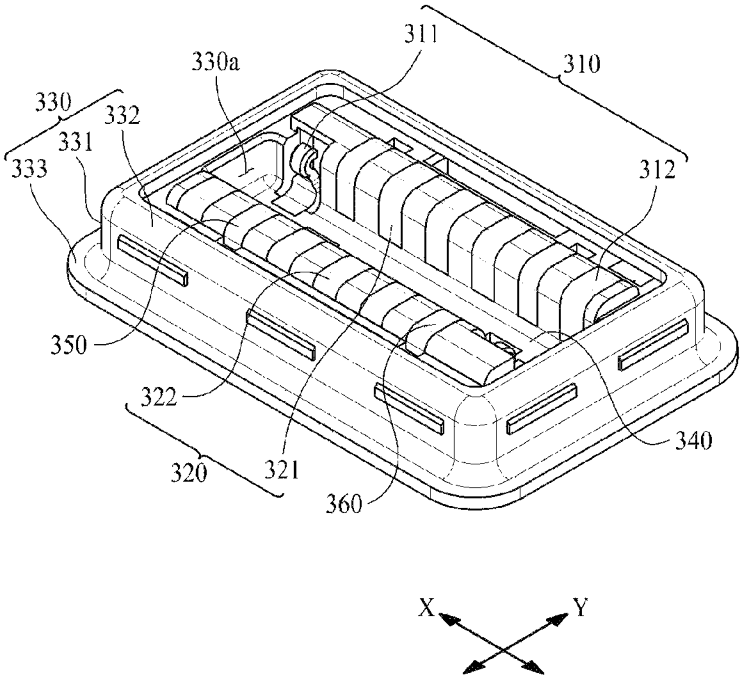
FIG. 17 is a schematic perspective view of the substrate connector according to the second example.
Figure 18:
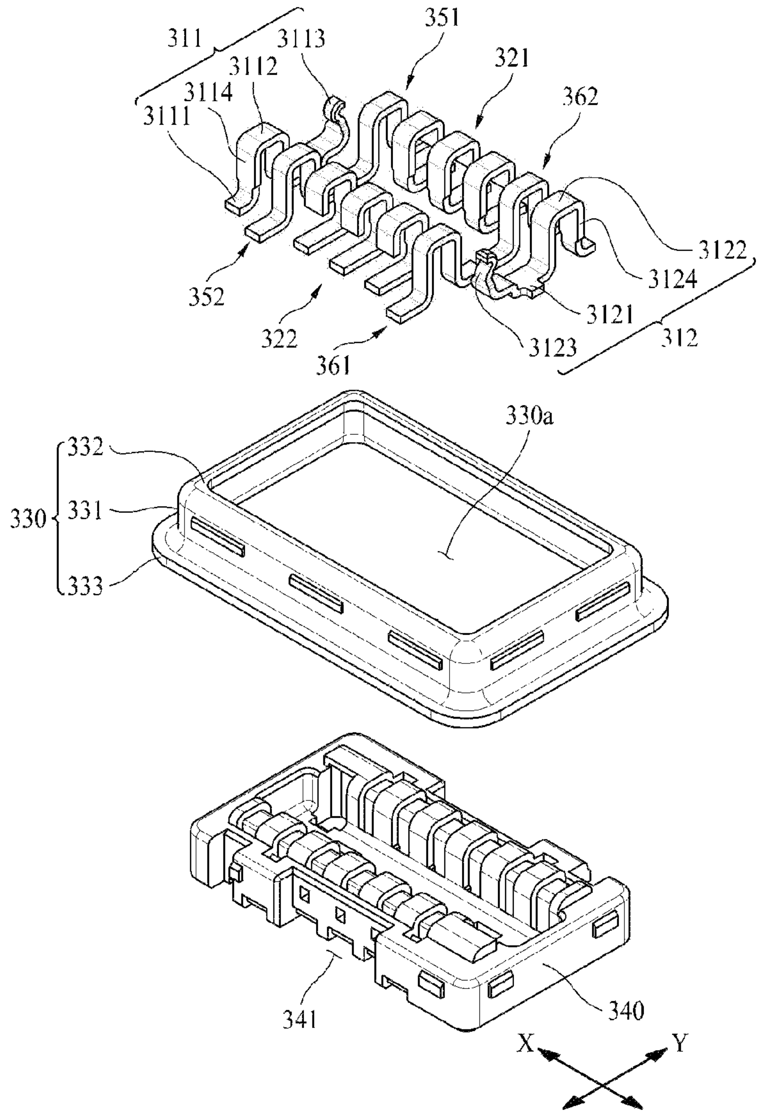
FIG. 18 is a schematic exploded perspective view of the substrate connector according to the second example.
Figure 19:
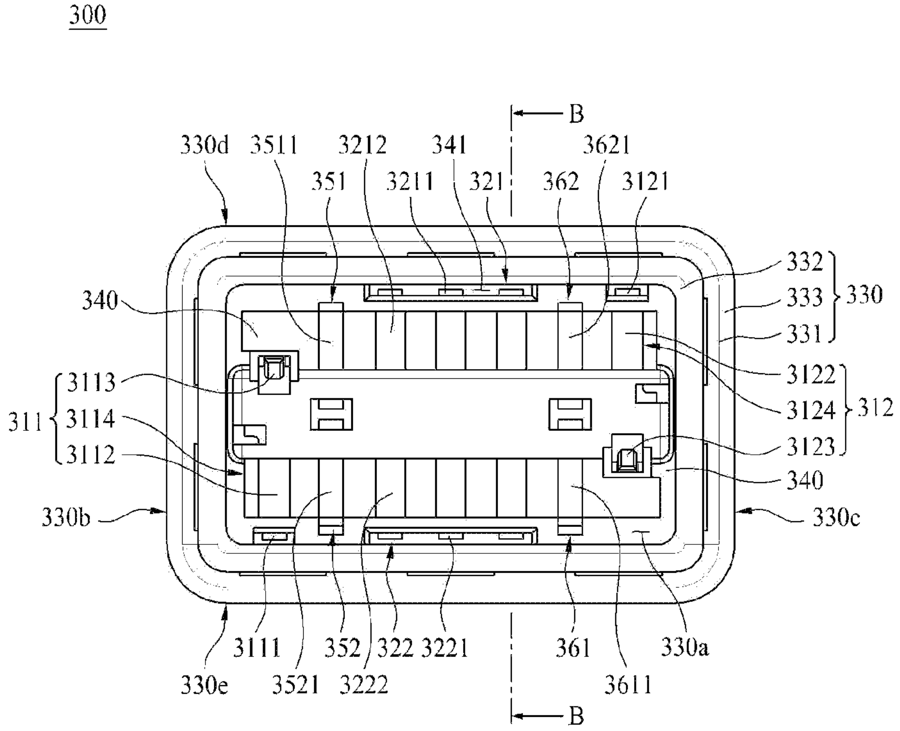
FIG. 19 is a schematic plan view of the substrate connector according to the second example.

Hereinafter, the exemplary embodiments of a substrate connector according to the present disclosure will be described in detail with reference to the accompanying drawings. In FIG. 14, the positions of portions corresponding to the inspection plane in the contacts are indicated by dotted squares. FIG. 16 shows the substrate connector according to the second example in a state of being reversed in the directions illustrated in FIGS. 2 and 17 and coupled to the substrate connector according to the first example. FIG. 16 is a schematic side cross-sectional view of the substrate connector according to a second example taken along line B-B of FIG. 19.

Figure 1:
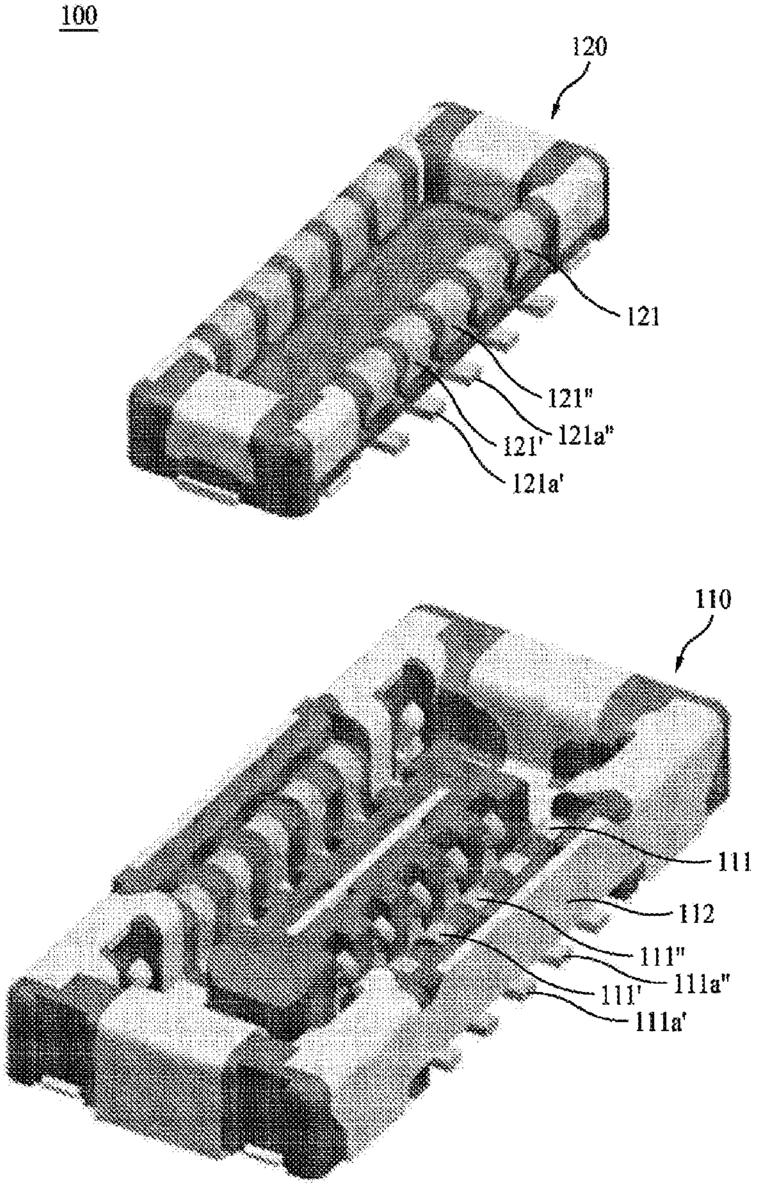
FIG. 1 is a schematic perspective view of a substrate connector according to the related art.
Figure 2:
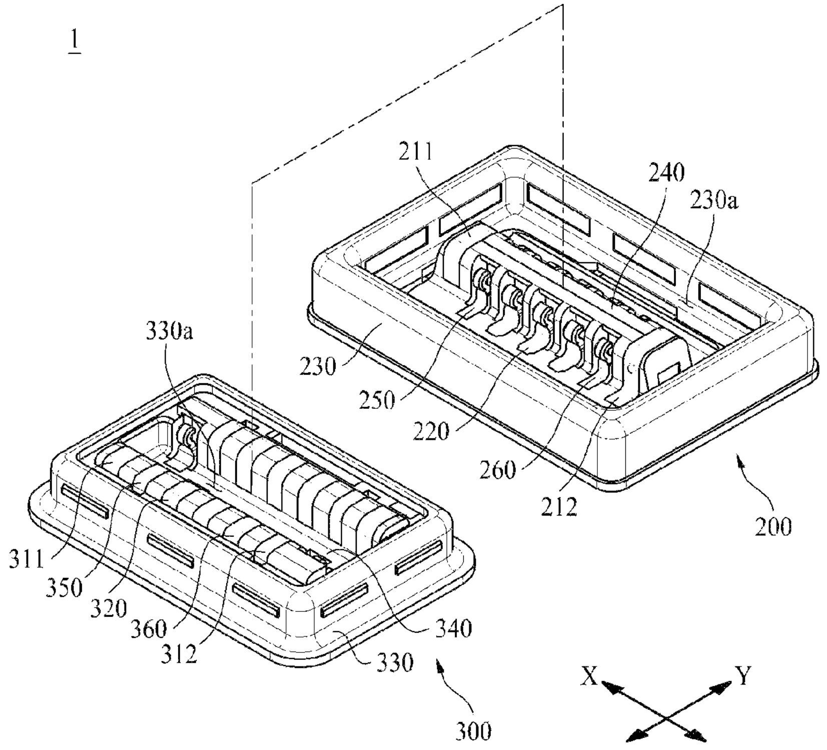
FIG. 2 is a schematic perspective view of a receptacle connector and a plug connector in the substrate connector according to the present disclosure.

Referring to FIG. 2, the substrate connector 1 according to the present disclosure may be installed in an electronic device (not illustrated) such as a mobile phone, a computer, a tablet computer or the like. The substrate connector 1 according to the present disclosure may be used to electrically connect a plurality of substrates (not illustrated). The substrates may be printed circuit boards (PCBs). For example, when the first substrate and the second substrate are electrically connected, a receptacle connector mounted on the first substrate and a plug connector mounted on the second substrate may be connected to each other. Accordingly, the first substrate and the second substrate may be electrically connected to each other through the receptacle connector and the plug connector. A plug connector mounted on the first substrate and a receptacle connector mounted on the second substrate may be connected to each other.

The substrate connector 1 according to the present disclosure may be implemented as the receptacle connector. The substrate connector 1 according to the present disclosure may be implemented as the plug connector. The substrate connector 1 according to the present disclosure may be implemented by including both the receptacle connector and the plug connector. Hereinafter, an exemplary embodiment in which the substrate connector 1 according to the present disclosure is implemented as the receptacle connector is defined as the substrate connector 200 according to the first example, and an exemplary embodiment in which the substrate connector 1 according to the present disclosure is implemented as the plug connector is defined as the substrate connector 300 according to the second example to be described in detail with reference to the accompanying drawings. In addition, an exemplary embodiment in which the substrate connector 200 according to the first example is mounted on the first substrate and the substrate connector 300 according to the second example is mounted on the second substrate will be described as a reference. From this, it will be apparent to those skilled in the art to derive an exemplary embodiment in which the substrate connector 1 according to the present disclosure includes both the receptacle connector and the plug connector.

Substrate Connector 200 According to the First Example

Figure 3:
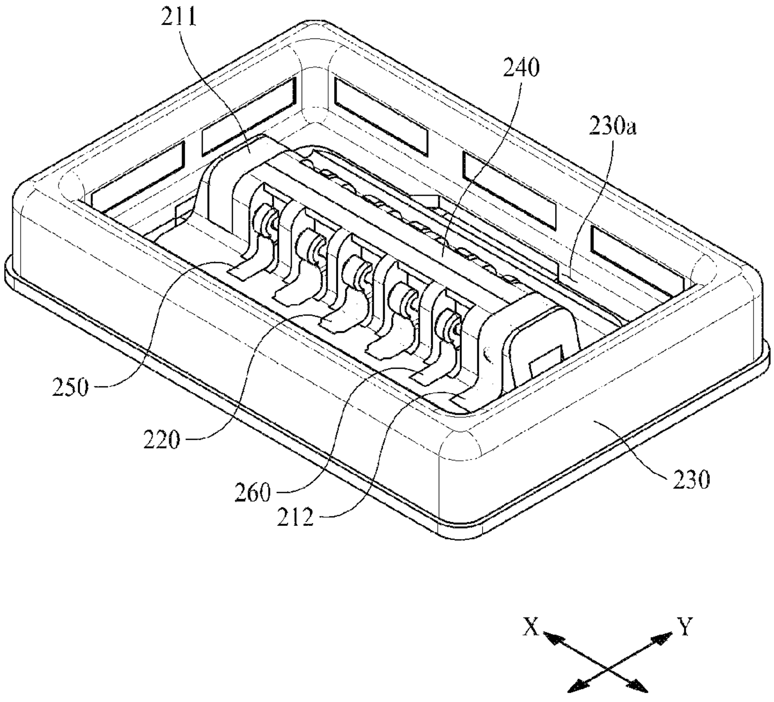
FIG. 3 is a schematic perspective view of the substrate connector according to the first example.
Figure 4:
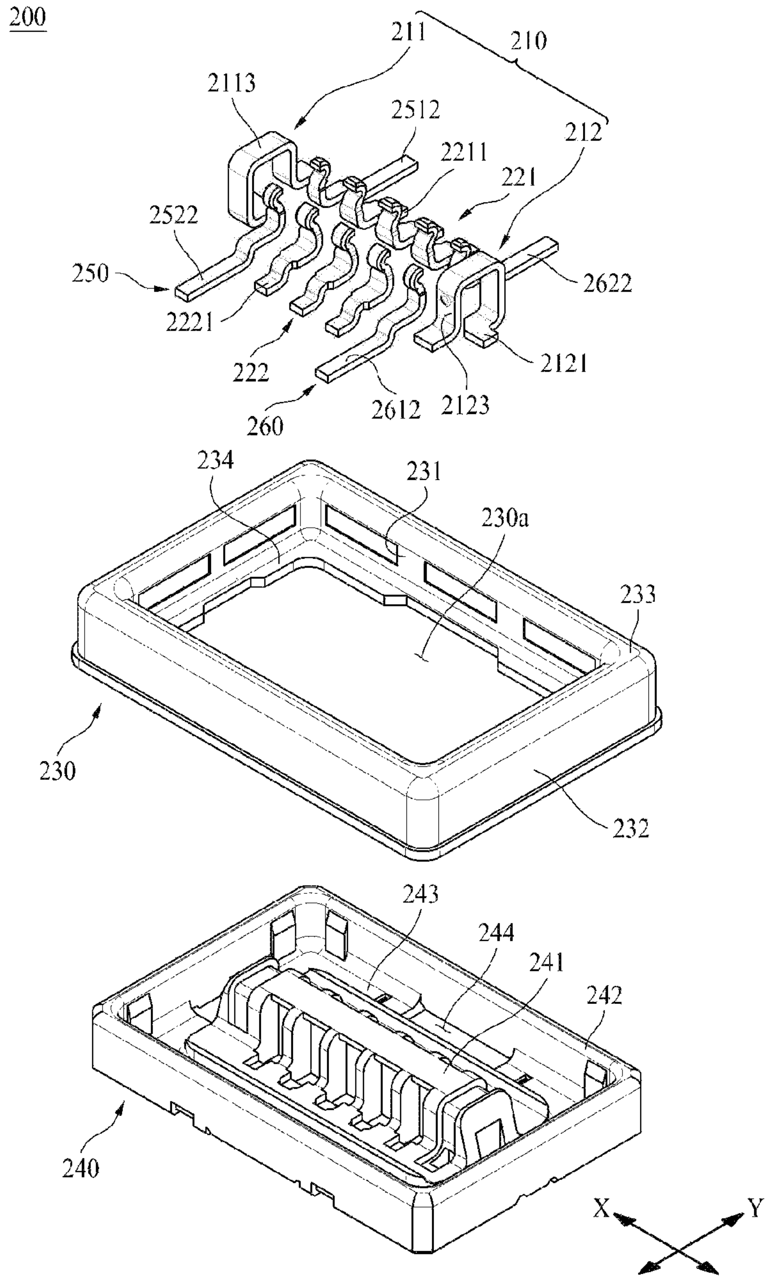
FIG. 4 is a schematic exploded perspective view of the substrate connector according to the first example.

Referring to FIGS. 2 to 4, the substrate connector 200 according to the first example may include a plurality of RF contacts 210, a plurality of transmission contacts 220, a ground housing 230 and an insulation unit 240.

The RF contacts 210 are for transmitting a radio frequency (RF) signal. The RF contacts 210 may transmit a very high-frequency RF signal. The RF contacts 210 may be supported by the insulation unit 240. The RF contacts 210 may be coupled to the insulation unit 240 through an assembly process. The RF contacts 210 may be integrally molded with the insulation unit 240 through injection molding.

The RF contacts 210 may be disposed to be spaced apart from each other. The RF contacts 210 may be electrically connected to the first substrate by being mounted on the first substrate. The RF contacts 210 may be electrically connected to the second substrate on which the counterpart connector is mounted by being connected to the RF contacts of the counterpart connector. Accordingly, the first substrate and the second substrate may be electrically connected. When the substrate connector 200 according to the first example is a receptacle connector, the counterpart connector may be a plug connector. When the substrate connector 200 according to the first example is a plug connector, the counterpart connector may be a receptacle connector.

A first RF contact 211 of the RF contacts 210 and a second RF contact 212 of the RF contacts 210 may be spaced apart from each other in a first axial direction (X-axis direction). The first RF contact 211 and the second RF contact 212 may be supported by the insulation unit 240 at positions spaced apart from each other in the first axial direction (X-axis direction).

The first RF contact 211 may include a first RF mounting member 2111. The first RF mounting member 2111 may be mounted on the first substrate. Accordingly, the first RF contact 211 may be electrically connected to the first substrate through the first RF mounting member 2111. The first RF contact 211 may be formed of a material having electrical conductivity. For example, the first RF contact 211 may be formed of a metal. The first RF contact 211 may be connected to any one of the RF contacts of the counterpart connector.

The second RF contact 212 may include a second RF mounting member 2121. The second RF mounting member 2121 may be mounted on the first substrate. Accordingly, the second RF contact 212 may be electrically connected to the first substrate through the second RF mounting member 2121. The second RF contact 212 may be formed of a material having electrical conductivity. For example, the second RF contact 212 may be formed of a metal. The second RF contact 212 may be connected to any one of the RF contacts of the counterpart connector.

Referring to FIGS. 2 to 5, the transmission contacts 220 are coupled to the insulation unit 240. The transmission contacts 220 may be in charge of transmitting a signal, data, power and the like. The transmission contacts 220 may be coupled to the insulation unit 240 through an assembly process. The transmission contacts 220 may be integrally molded with the insulation unit 240 through injection molding.

The transmission contacts 220 may be disposed between the first RF contact 211 and the second RF contact 212 on the basis of the first axial direction (X-axis direction). Accordingly, the transmission contact 220 may be placed in a space spaced apart from the first RF contact 211 and the second RF contact 212 to reduce RF signal interference between the first RF contact 211 and the second RF contact 212. Therefore, the substrate connector 200 according to the first example may not only reduce RF signal interference by increasing the distance between the first RF contact 211 and the second RF contact 212 spaced apart from each other, but also it is possible to improve the space utilization of the insulator 240 by disposing the transmission contacts 220 in a space which is spaced apart for this purpose.

The transmission contacts 220 may be disposed to be spaced apart from each other. The transmission contacts 220 may be electrically connected to the first substrate by being mounted on the first substrate. In this case, the transmission mounting members 2211, 2221 of each of the transmission contacts 220 may be mounted on the first substrate. The transmission contacts 220 may be formed of a material having electrical conductivity. For example, the transmission contacts 220 may be formed of a metal. The transmission contacts 220 may be electrically connected to the second substrate on which the counterpart connector is mounted by being connected to the transmission contacts of the counterpart connector. Accordingly, the first substrate and the second substrate may be electrically connected.

The first transmission contacts 221 of the transmission contacts 220 and the second transmission contacts 222 of the transmission contacts 220 may be disposed to be spaced apart from each other in the second axial direction (Y-axis direction). The second axial direction (Y-axis direction) is an axial direction perpendicular to the first axial direction (X-axis direction). The first transmission contacts 221 may be disposed to be spaced apart from each other in the first axial direction (X-axis direction). The second transmission contacts 222 may be disposed to be spaced apart from each other in the first axial direction (X-axis direction).

Referring to FIGS. 2 to 5, the ground housing 230 is coupled to the insulation unit 240. The ground housing 230 may be grounded by being mounted on the first substrate. Accordingly, the ground housing 230 may implement a shielding function for signals, electromagnetic waves and the like for the RF contacts 210. In this case, the ground housing 230 may prevent electromagnetic waves generated from the RF contacts 210 from interfering with signals of circuit components located in the vicinity of the electronic device, and may prevent electromagnetic waves generated from circuit components located in the vicinity of the electronic device from interfering with the RF signals transmitted by the RF contacts 210. Accordingly, the substrate connector 200 according to the first example may contribute to improving the EMI (Electro Magnetic Interference) shielding performance and EMC (Electro Magnetic Compatibility) performance by using the ground housing 230. The ground housing 230 may be formed of a material having electrical conductivity. For example, the ground housing 230 may be formed of a metal.

The ground housing 230 may be disposed to surround the side of the inner space 230*a*. A portion of the insulation unit 240 may be positioned in the inner space 230*a*. All of the first RF contact 211, the second RF contact 212 and the transmission contact 220 may be located in the inner space 230*a*. In this case, all of the first RF mounting member 2111, the second RF mounting member 2121 and the transmission mounting members 2211, 2221 may also be located in the inner space 230*a*. Accordingly, the ground housing 230 implements a shielding wall for all of the first RF contact 211 and the second RF contact 212, and thus, it is possible to realize complete shielding by strengthening the shielding function for the first RF contact 211 and the second RF contact 212. The counterpart connector may be inserted into the inner space 230*a*.

The ground housing 230 may be disposed to surround all sides with respect to the inner space 230*a*. The inner space 230*a* may be disposed inside the ground housing 230. When the ground housing 230 is formed in a rectangular ring shape as a whole, the inner space 230*a* may be formed in a rectangular parallelepiped shape. In this case, the ground housing 230 may be disposed to surround four sides with respect to the inner space 230*a*.

The ground housing 230 may be integrally formed without a seam. The ground housing 230 may be integrally formed without a seam by the metal injection method such as the metal die casting method or the metal injection molding (MIM) method. The ground housing 230 may be integrally formed without a seam by CNC (Computer Numerical Control) machining, MCT (Machining Center Tool) machining or the like.

Referring to FIGS. 2 to 5, the insulation unit 240 supports the RF contacts 210. The RF contacts 210 and the transmission contacts 220 may be coupled to the insulation unit 240. The insulation unit 240 may be formed of an insulating material. The insulation unit 240 may be coupled to the ground housing 230 such that the RF contacts 210 are positioned in the inner space 230*a*.

Referring to FIGS. 2 to 6, the substrate connector 200 according to the first example may include a first ground contact 250.

The first ground contact 250 is coupled to the insulation unit 240. The first ground contact 250 may be grounded by being mounted on the first substrate. The first ground contact 250 may be coupled to the insulation unit 240 through an assembly process. The first ground contact 250 may be integrally molded with the insulation unit 240 through injection molding.

The first ground contact 250 may implement a shielding function for the first RF contact 211 together with the ground housing 230. In this case, the first ground contact 250 may be disposed between the first RF contact 211 and the transmission contacts 220 on the basis of the first axial direction (X-axis direction). The first ground contact 250 may be formed of a material having electrical conductivity. For example, the first ground contact 250 may be formed of a metal. When the counterpart connector is inserted into the inner space 230*a*, the first ground contact 250 may be connected to a ground contact of the counterpart connector.

Referring to FIGS. 2 to 5, the substrate connector 200 according to the first example may include a second ground contact 260.

The second ground contact 260 is coupled to the insulation unit 240. The second ground contact 260 may be grounded by being mounted on the first substrate. The second ground contact 260 may be coupled to the insulation unit 240 through an assembly process. The second ground contact 260 may be integrally molded with the insulation unit 240 through injection molding.

The second ground contact 260 may implement a shielding function for the second RF contact 212 together with the ground housing 230. The second ground contact 260 may be disposed between the transmission contacts 220 and the second RF contact 212 on the basis of the first axial direction (X-axis direction). The second ground contact 260 may be formed of a material having electrical conductivity. For example, the second ground contact 260 may be formed of a metal. When the counterpart connector is inserted into the inner space 230*a*, the second ground contact 260 may be connected to a ground contact of the counterpart connector.

Herein, the substrate connector 200 according to the first example may be inspected by an inspection instrument (not illustrated) in order to check whether performance is abnormal in a state where it is mounted on the first substrate. The inspection instrument may perform the inspection on the substrate connector 200 according to the first example in a state where the probes are brought into contact with at least one of the contacts 210, 220, 250, 260. For example, the inspection instrument may be a probe card. As described above, the substrate connector 200 according to the first example may be implemented as follows such that the inspection through the contact of the inspection instrument can be smoothly performed.

First, the first RF contact 211 may be implemented as follows.

Referring to FIGS. 2 to 10, the first RF contact 211 may include a first RF inspection plane 2112.

The first RF inspection plane 2112 is for contacting the inspection instrument. The inspection instrument may perform an inspection on the first RF contact 211 in a state in contact with the first RF inspection plane 2112. The first RF inspection plane 2112 may be formed as a flat surface. Accordingly, since the substrate connector 200 according to the first example may secure an area for the inspection instrument to contact the first RF contact 211 by using the first RF inspection plane 2112, it is possible to improve the ease and accuracy of the contact between the inspection instrument and the first RF contact 211. Therefore, the substrate connector 200 according to the first example may improve the accuracy of the inspection result for the first RF contact 211 by using the first RF inspection plane 2112. Further, in the case of the comparative example in which the surface of the first RF contact 211 for contacting the inspection instrument is formed as a curved surface, slip or the like occurs while the inspection instrument is in contact with the curved surface, and thus, the contact reliability between the inspection instrument and the first RF contact 211 may be reduced. In contrast, in the substrate connector 200 according to the first example, since the first RF inspection plane 2112 is formed as a flat surface, it is implemented to prevent slip or the like from occurring in the process of the inspection instrument being in contact with the first RF inspection plane 2112. Accordingly, the substrate connector 1 according to the first example may improve the contact reliability between the inspection instrument and the first RF contact 211.

When the width H (illustrated in FIGS. 7 and 8) based on the first axial direction (X-axis direction) of the first RF inspection plane 2112 is 1, it may be formed as a plane with the length L (illustrated in FIGS. 7 and 8) of 0.5 or more based on the second axial direction (Y-axis direction). If the ratio of the length L to the width H of the first RF inspection plane 2112 is less than 0.5, the length L of the first RF inspection plane 2112 is too short, and thus, it is difficult to make accurate contact between the inspection instrument and the first RF inspection 2112. In consideration of this, in the substrate connector 200 according to the first example, the first RF inspection plane 2112 is formed in a plane in which the ratio of the length L to the width H is 0.5 or more, and thus, it is possible to improve the ease and accuracy of the contact between the inspection instrument and the first RF contact 211.

When the width H (illustrated in FIGS. 7 and 8) based on the first axial direction (X-axis direction) of the first RF inspection plane 2112 is 1, it may be formed as a plane with the length L (illustrated in FIGS. 7 and 8) of 1.5 or less based on the second axial direction (Y-axis direction). If the ratio of the length L to the width H of the first RF inspection plane 2112 is more than 1.5, the length of the first RF contact 211 is too long due to the first RF inspection plane 2112, and thus, it is difficult to realize miniaturization. In consideration of this, in the substrate connector 200 according to the first example, the first RF inspection plane 2112 is formed in a plane in which the ratio of the length L to the width H is 1.5 or less, thereby realizing miniaturization.

When the width H (illustrated in FIGS. 7 and 8) based on the first axial direction (X-axis direction) of the first RF inspection plane 2112 is 1, it may be formed as a plane with the length L (illustrated in FIGS. 7 and 8) of 0.5 or more to 1.5 or less based on the second axial direction (Y-axis direction). That is, the first RF inspection plane 2112 may be formed in a plane in which the ratio of the length L to the width H is 0.5 or more to 1.5 or less. Accordingly, the substrate connector 200 according to the first example may not only secure an area for the inspection instrument to contact the first RF contact 211 by using the first RF inspection plane 2112, but also it is possible to realize miniaturization by reducing the overall size.

The first RF contact 211 may include a first RF connecting member 2113.

The first RF connecting member 2113 is for connecting to the RF contact of the counterpart connector. As the first RF connecting member 2113 is connected to the RF contact of the counterpart connector, the first RF contact 211 may be electrically connected to the RF contact of the counterpart connector. The first RF connecting member 2113 may be connected to the first RF mounting member 2111. The first RF connecting member 2113 may be directly coupled to the first RF mounting member 2111. The first RF connecting member 2113 is coupled to another member of the first RF connecting member 2113, and may be connected to the first RF mounting member 2111 through the member. The first RF connecting member 2113 may be implemented in a form where a plate material disposed in a vertical direction and a plate material disposed in a horizontal direction are combined through bending processing for the plate material.

Figure 9:
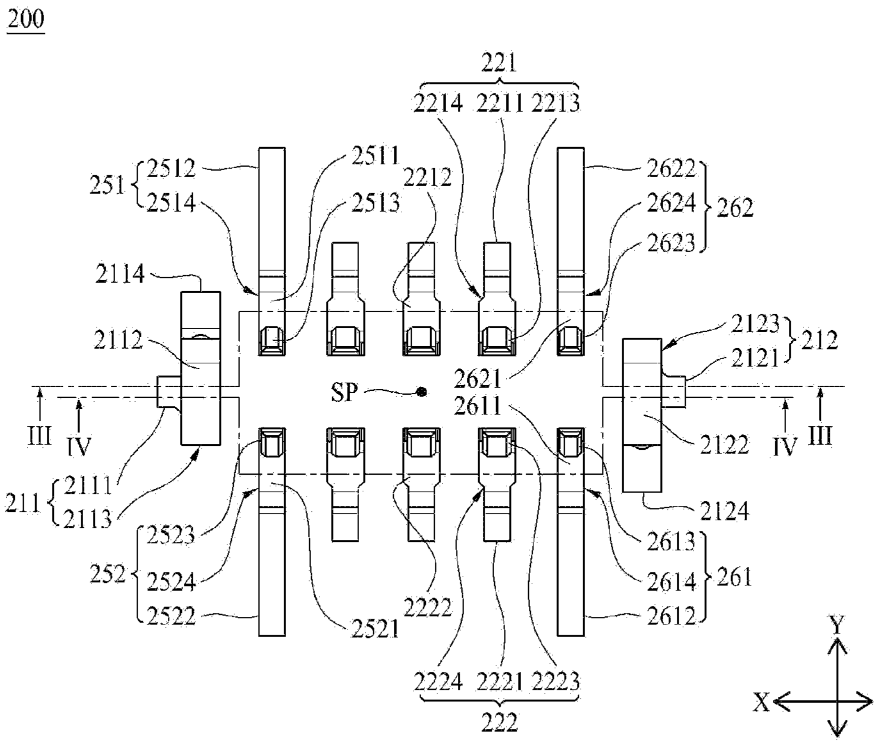
FIG. 9 is a schematic plan view of contacts in the substrate connector according to the first example.

When the first RF contact 211 includes the first RF connecting member 2113 and the first RF mounting member 2111, the first RF inspection plane 2112 may be formed on the first RF connecting member 2113 or the first RF mounting member 2111. As illustrated in FIG. 9, when the first RF inspection plane 2112 is formed on the first RF connecting member 2113, the first RF inspection plane 2112 may be formed on a surface of the first RF connecting member 2113 facing the inner space 230*a*. In this case, the first RF connecting member 2113 may have a connection function for the RF contact of the counterpart connector and a contact function for the inspection instrument. Although not illustrated, when the first RF inspection plane 2112 is formed on the first RF mounting member 2111, the first RF inspection plane 2112 may be formed on a surface of the first RF mounting member 2111 facing the inner space 230*a*. In this case, the first RF mounting member 2111 may have a mounting function for the substrate and a contact function for the inspection instrument.

The first RF contact 211 may include a first RF inspection member 2114.

Figure 5:
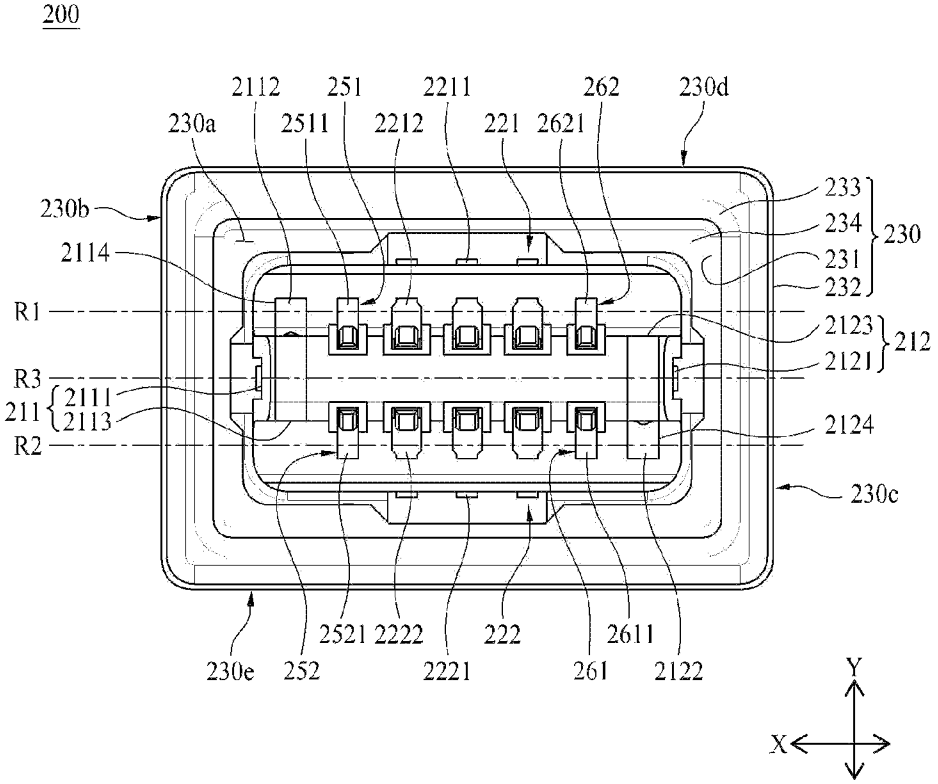
FIG. 5 is a schematic plan view of the substrate connector according to the first example.
Figure 6:
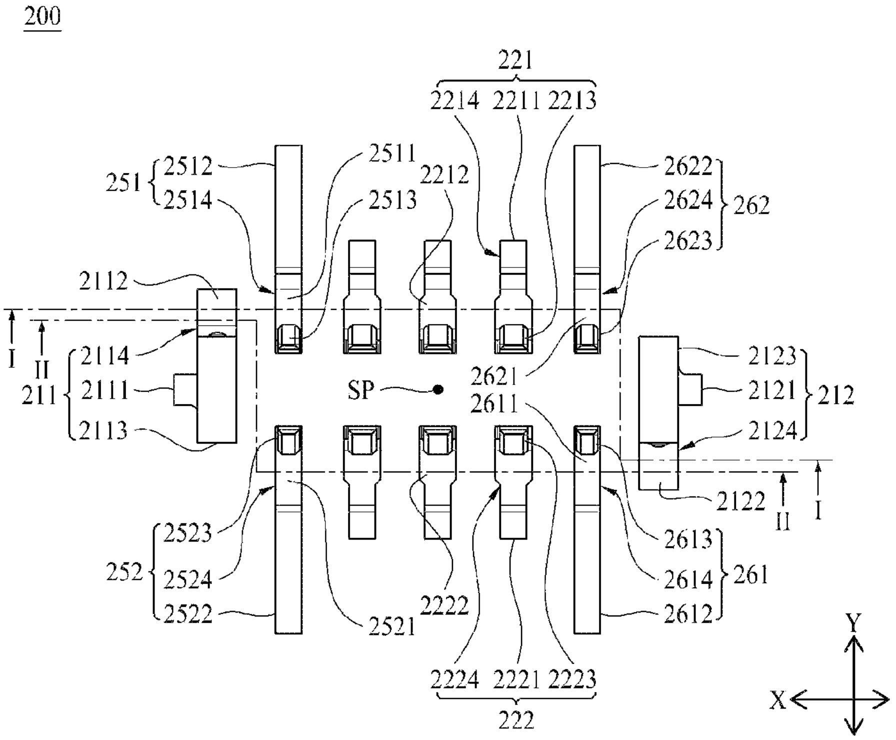
FIG. 6 is a schematic plan view of contacts in the substrate connector according to the first example.
Figure 7:
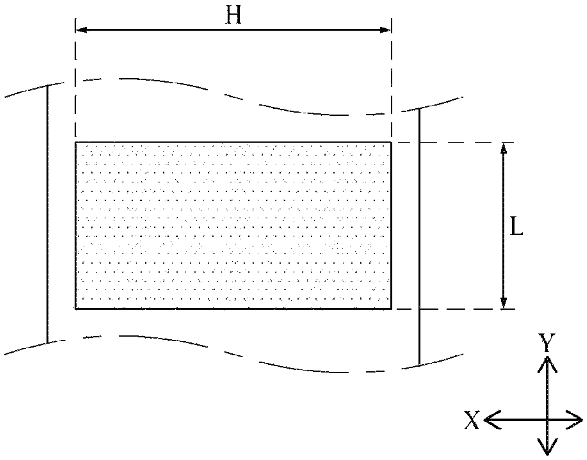
FIGS. 7 and 8 are schematic plan views showing enlarged inspection planes of contacts in the substrate connector according to the first example.
Figure 8:
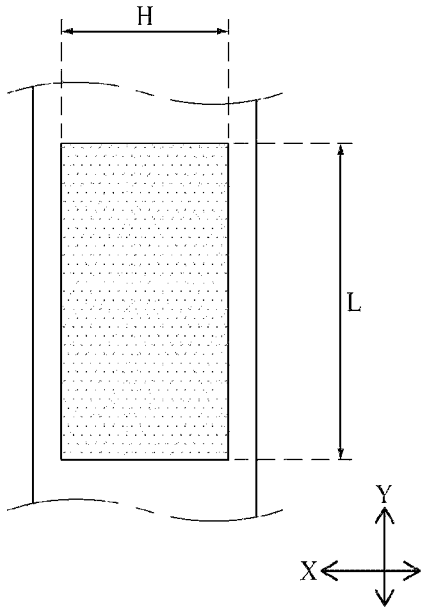

The first RF inspection member 2114 is for contacting the inspection instrument. In this case, as illustrated in FIGS. 5 and 6, the first RF inspection plane 2112 may be formed on the first RF inspection member 2114. The first RF inspection plane 2112 may be formed on a surface of the first RF inspection member 2114 facing the inner space 230*a*. The first RF inspection member 2114 may be coupled to the first RF connecting member 2113 or the first RF mounting member 2111. As illustrated in FIG. 6, the first RF inspection member 2114 may be coupled to the first RF connecting member 2113 to protrude from the first RF connecting member 2113. In this case, the first RF inspection member 2114 may have a support function supported by the insulation unit 240 and a contact function for the inspection instrument. The first RF inspection member 2114 may be coupled to each of the first RF connecting member 2113 and the first RF mounting member 2111. In this case, the first RF inspection member 2114 may have a connection function for connecting the first RF connecting member 2113 and the first RF mounting member 2111 and a contact function for the inspection instrument. Even when the first RF inspection member 2114 is provided, the first RF inspection plane 2112 may be formed on the first RF mounting member 2111 or the first RF connecting member 2113. In this case, the first RF inspection member 2114 may have a support function for the insulation unit 240 or a connection function for connecting the first RF connecting member 2113 and the first RF mounting member 2111.

Meanwhile, when the first RF inspection plane 2112 is formed in a portion of the first RF contact 211 that is covered by the insulation unit 240, an inspection connection window (not illustrated) may be formed in the insulation unit 240. Accordingly, the first RF inspection plane 2112 may be disposed to be exposed to the inner space 230*a* without being covered by the insulation unit 240 through the inspection connection window.

Next, the second RF contact 212 may be implemented as follows.

Referring to FIGS. 2 to 14, the second RF contact 212 may include a second RF inspection plane 2122. The second RF inspection plane 2122 is for contacting the inspection instrument. Since the second RF inspection plane 2122 is implemented to substantially coincide with the first RF inspection plane 2112 of the first RF contact 211 as described above, the detailed description thereof will be omitted.

The second RF contact 212 may include a second RF connecting member 2123. The second RF connecting member 2123 is for connecting to the RF contact of the counterpart connector. Since the second RF connecting member 2123 is implemented to substantially coincide with the first RF connecting member 2113 of the first RF contact 211 as described above, the detailed description thereof will be omitted. The second RF inspection plane 2122 may be formed on the second RF connecting member 2123 or the second RF mounting member 2121.

The second RF contact 212 may include a second RF inspection member 2124. The second RF inspection member 2124 is for contacting the inspection instrument. Since the second RF inspection member 2124 is implemented to substantially coincide with the first RF inspection member 2114 of the first RF contact 211 as described above, the detailed description thereof will be omitted. The second RF inspection plane 2122 may be formed on the second RF inspection member 2124.

As illustrated in FIGS. 10 to 13, the second RF inspection plane 2122 and the first RF inspection plane 2112 may be disposed on a plane having the same height. Accordingly, since the height at which the inspection instrument is raised and lowered to contact each of the second RF inspection plane 2122 and the first RF inspection plane 2112 may be implemented to be the same, the substrate connector 1 according to the first example may further improve the ease and accuracy of the inspection operation of the first RF contact 211 and the second RF contact 212. Further, in the substrate connector 1 according to the first example, since it is possible for the inspection instrument to contact the second RF inspection plane 2122 and the first RF inspection plane 2112 at the same time, it may contribute to shorten the time taken to perform the inspection operation of the first RF contact 211 and the second RF contact 212.

Meanwhile, the portion of the second RF contact 212 on which the second RF inspection plane 2122 is formed and the portion of the first RF contact 211 on which the first RF inspection plane 2112 is formed may have the same function. For example, as illustrated in FIG. 6, when the second RF inspection plane 2122 is formed on the second RF inspection member 2124, the first RF inspection plane 2112 may be formed on the first RF inspection member 2114. For example, when the second RF inspection plane 2122 is formed on the second RF connecting member 2123 as illustrated in FIG. 9, the first RF inspection plane 2112 may be formed on the first RF connecting member 2113. For example, when the second RF inspection plane 2122 is formed on the second RF mounting member 2121, the first RF inspection plane 2112 may be formed on the first RF mounting member 2111.

Next, each of the first transmission contacts 221 may be implemented as follows.

Referring to FIGS. 2 to 14, the first transmission contact 221 may include a first transmission mounting member 2211.

The first transmission mounting member 2211 is for mounting on the first substrate. The first transmission contact 221 may be electrically connected to the first substrate through the first transmission mounting member 2211. The first transmission mounting member 2211 may be formed in a plate shape arranged in a horizontal direction.

The first transmission contact 221 may include a first transmission inspection plane 2212.

The first transmission inspection plane 2212 is for contacting the inspection instrument. The inspection instrument may perform the inspection on the first transmission contact 221 while being in contact with the first transmission inspection plane 2212. The first transmission inspection plane 2212 may be formed as a flat surface. Accordingly, since the substrate connector 200 according to the first example may secure an area for the inspection instrument to contact the first transmission contact 221 by using the first transmission inspection plane 2212, it is possible to improve the ease and accuracy of the contact between the inspection instrument and the first transmission contact 221. Accordingly, in the substrate connector 200 according to the first example, the accuracy of the inspection result for the first transmission contact 221 may be improved by using the first transmission inspection plane 2212. Further, in comparison with the comparative example in which the surface of the first transmission contact 221 for contacting the inspection instrument is formed as a curved surface, since the first transmission inspection plane 2212 is formed as a plane in the substrate connector 200 according to the first example, it is implemented to prevent slip or the like from occurring in the process of contacting the inspection instrument with the first transmission inspection plane 2212. Accordingly, the substrate connector 1 according to the first example may improve the contact reliability between the inspection instrument and the first transmission contact 221.

When the width H (illustrated in FIGS. 7 and 8) of the first transmission inspection plane 2212 on the basis of the first axial direction (X-axis direction) is 1, it may be formed as a plane with the length L (illustrated in FIGS. 7 and 8) of 0.5 or more based on the second axial direction (Y-axis direction). When the width H (illustrated in FIGS. 7 and 8) of the first transmission inspection plane 2212 on the basis of the first axial direction (X-axis direction) is 1, it may be formed as a plane with the length L (illustrated in FIGS. 7 and 8) of 1.5 or less based on the second axial direction (Y-axis direction). When the width H (illustrated in FIGS. 7 and 8) of the first transmission inspection plane 2212 on the basis of the first axial direction (X-axis direction) is 1, it may be formed as a plane with the ratio of the length L to the height H of 0.5 or more to 1.5 or less based on the second axial direction (Y-axis direction). That is, the first transmission inspection plane 2212 may be formed as a plane in which the ratio of the length L to the width H is 0.5 or more to 1.5 or less. Accordingly, the substrate connector 200 according to the first example may not only secure an area for the inspection instrument to contact the first transmission contact 221 by using the first transmission inspection plane 2212, but also it is possible to realize miniaturization by reducing the overall size.

The first transmission contact 221 may include a first transmission connecting member 2213.

The first transmission connecting member 2213 is to for connecting to the transmission contact of the counterpart connector. As the first transmission connecting member 2213 is connected to the transmission contact of the counterpart connector, the first transmission contact 221 may be electrically connected to the transmission contact of the counterpart connector. The first transmission connecting member 2213 may be connected to the first transmission mounting member 2211. The first transmission connecting member 2213 may be directly coupled to the first transmission mounting member 2211. The first transmission connecting member 2213 may be coupled to another member of the first transmission connecting member 2213 and may be connected to the first transmission mounting member 2211 through the member. The first transmission connecting member 2213 may be implemented in a form where a plate material disposed in a vertical direction and a plate material disposed in a horizontal direction are combined through bending processing for the plate material.

The first transmission contact 221 may include a first transmission inspection member 2214.

The first transmission inspection member 2214 is for contacting the inspection instrument. In this case, as illustrated in FIGS. 5 and 6, the first transmission inspection plane 2212 may be formed on the first transmission inspection member 2214. The first transmission inspection plane 2212 may be formed on a surface of the first transmission inspection member 2214 facing the inner space 230*a*. The first transmission inspection member 2214 may be coupled to each of the first transmission connecting member 2213 and the first transmission mounting member 2211. In this case, the first transmission inspection member 2214 may have a connection function for connecting the first transmission connecting member 2213 and the first transmission mounting member 2211 and a contact function for the inspection instrument. The first transmission inspection member 2214 may be coupled to the first transmission connecting member 2213 or the first transmission mounting member 2211. In this case, the first transmission inspection member 2214 may have a support function supported by the insulation unit 240 and a contact function for the inspection instrument.

Although not illustrated, even when the first transmission inspection member 2214 is provided, the first transmission inspection plane 2212 may be formed on the first transmission mounting member 2211 or the first transmission connecting member 2213. When the first transmission inspection plane 2212 is formed on the first transmission mounting member 2211, the first transmission mounting member 2211 may have a mounting function to the substrate and a contact function to the inspection instrument. When the first transmission inspection plane 2212 is formed on the first transmission connecting member 2213, the first transmission connecting member 2213 has a connection function for a connection contact of the counterpart connector and a contact function for the inspection instrument. When the first transmission inspection plane 2212 is formed on the first transmission mounting member 2211 or the first transmission connecting member 2213, the first transmission inspection member 2214 may have a support function for the insulating part 240 or a connection function for connecting the first transmission connecting member 2213 and the first transmission mounting member 2211.

Meanwhile, when the first transmission inspection plane 2212 is formed in a portion of the first transmission contact 221 that is covered by the insulation unit 240, an inspection connection window (not illustrated) may be formed on the insulation unit 240. Accordingly, the first transmission inspection plane 2212 may be disposed to be exposed to the inner space 230*a* without being covered by the insulation unit 240 through the inspection connection window.

Next, each of the second transmission contacts 222 may be implemented as follows.

Referring to FIGS. 2 to 14, the second transmission contact 222 may include a second transmission mounting member 2221. The second transmission mounting member 2221 is for mounting on the first substrate. Since the second transmission mounting member 2221 is implemented to substantially coincide with the first transmission mounting member 2211 of the first transmission contact 221 as described above, the detailed description thereof will be omitted.

The second transmission contact 222 may include a second transmission inspection plane 2222. The second transmission inspection plane 2222 is for contacting the inspection instrument. Since the second transmission inspection plane 2222 is implemented to substantially coincide with the first transmission inspection plane 2212 of the first transmission contact 221 as described above, the detailed description thereof will be omitted.

The second transmission contact 222 may include a second transmission connecting member 2223. The second transmission connecting member 2223 is for connecting to the transmission contact of the counterpart connector. Since the second transmission connecting member 2223 is implemented to substantially coincide with the first transmission connecting member 2213 of the first transmission contact 221 as described above, the detailed description thereof will be omitted.

The second transmission contact 222 may include a second transmission inspection member 2224. The second transmission inspection member 2224 is for contacting the inspection instrument. Since the second transmission inspection member 2224 is implemented to substantially coincide with the first transmission inspection member 2214 of the first transmission contact 221 as described above, the detailed description thereof will be omitted. The second transmission inspection plane 2222 may be formed on any one of the second transmission inspection member 2224, the second transmission connecting member 2223 and the second transmission mounting member 2221.

As illustrated in FIGS. 10 to 13, the second transmission inspection plane 2222 and the first transmission inspection plane 2212 may be disposed on a plane having the same height. Accordingly, since the height at which the inspection instrument is raised and lowered to come into contact with each of the second transmission inspection plane 2222 and the first transmission inspection plane 2212 may be implemented to be the same, the substrate connector 1 according to the first example may further improve the ease and accuracy of the inspection operation of the first transfer contact 221 and the second transfer contact 222. Further, in the substrate connector 1 according to the first example, since the inspection instrument may contact the second transmission inspection plane 2222 and the first transmission inspection plane 2212 at the same time, it may contribute to shortening the time required to perform the inspection operation of the first transfer contact 221 and the second transfer contact 222. Meanwhile, the portion of the second transmission contact 222 on which the second transmission inspection plane 2222 is formed and the portion of the first transmission contact 221 on which the first transmission inspection plane 2212 is formed may have the same function.

Figure 10:
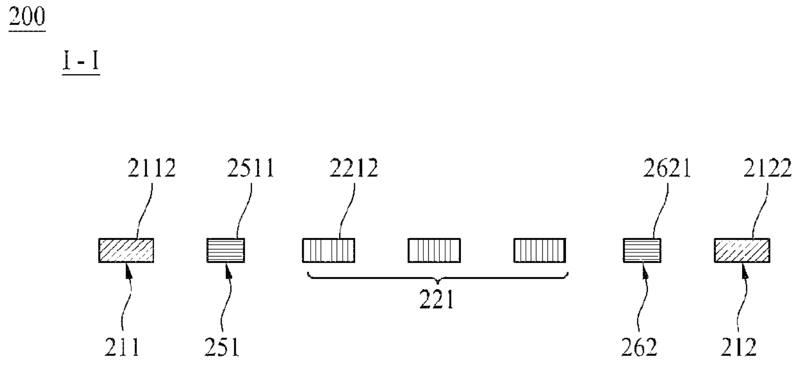
FIG. 10 is a schematic cross-sectional view taken along line I-I of FIG. 6.
Figure 11:
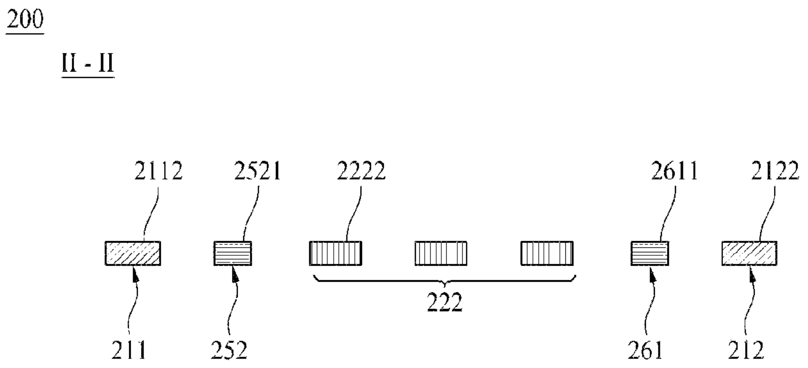
FIG. 11 is a schematic cross-sectional view taken along line II-II of FIG. 6.

As illustrated in FIGS. 10 and 11, the second transmission inspection plane 2222, the first transmission inspection plane 2212, the second RF inspection plane 2122 and the first RF inspection plane 2112 may be disposed on a plane having the same height. Accordingly, since the height at which the inspection instrument is raised or lowered to contact each of the second transmission inspection plane 2222, the first transmission inspection plane 2212, the second RF inspection plane 2122 and the first RF inspection plane 2112 may be implemented to be the same, the substrate connector 1 according to the first example may further improve the easy and accuracy of the inspection operation of the second transmission contact 222, the first transmission contact 221, the second RF contact 212 and the first RF contact 211. Further, in the substrate connector 1 according to the first example, since the inspection instrument can simultaneously contact the second transmission inspection plane 2222, the first transmission inspection plane 2212, the second RF inspection plane 2122 and the first RF inspection plane 2112, it may contribute to further shortening the time taken to perform the inspection operation of the second transmission contact 222, the first transmission contact 221, the second RF contact 212 and the first RF contact 211.

Figure 12:
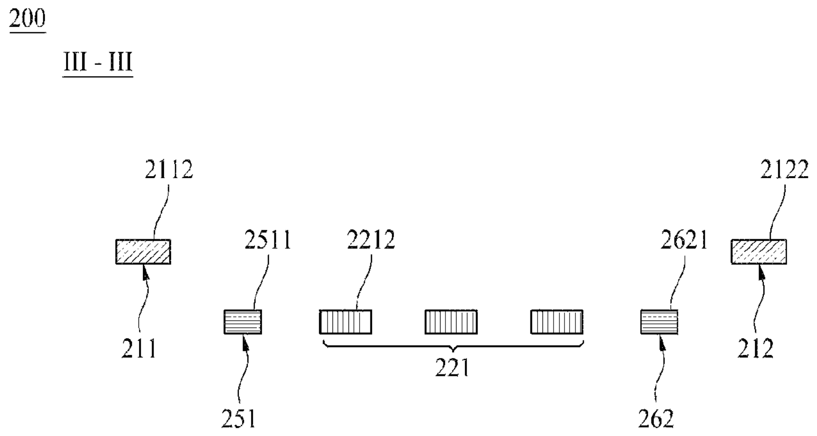
FIG. 12 is a schematic cross-sectional view taken along line of FIG. 9.
Figure 13:
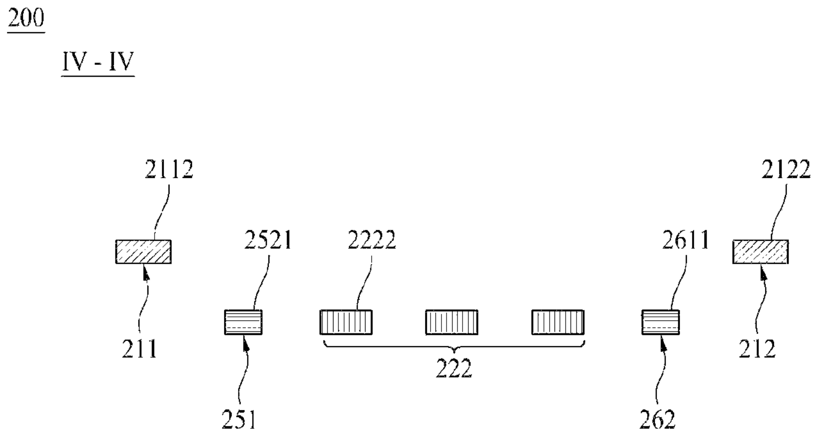
FIG. 13 is a schematic cross-sectional view taken along the line VI-VI of FIG. 9.

As illustrated in FIGS. 12 and 13, the first RF inspection plane 2112 may be disposed at a higher position than the first transmission inspection planes 2212. In this case, the first RF inspection plane 2112 and the second RF inspection plane 2122 may be disposed on a plane having the same height. The first transmission inspection planes 2212 and the second transmission inspection planes 2222 may be disposed on a plane having the same height, and may be disposed in a lower position than the first RF inspection plane 2112 and the second RF inspection plane 2122. Accordingly, the substrate connector 1 according to the first example may be suitably implemented such that an inspection operation in which the inspection instrument simultaneously inspects the first RF contact 211 and the second RF contact 212 and an inspection operation in which the inspection instrument simultaneously inspects the first transmission contacts 221 and the second transmission contacts 222 are individually performed. Although not illustrated, the first RF inspection plane 2112 may be disposed at a lower position than the first transmission inspection planes 2212. In this case, the first transmission inspection planes 2212 and the second transmission inspection planes 2222 may be disposed on a plane having the same height, and may be disposed at a higher position than the first RF inspection plane 2112 and the second RF inspection plane 2122.

As illustrated in FIGS. 5 and 6, the first RF inspection plane 2112 and the first transmission inspection plane 2122 may be disposed on a first row R1 which is parallel to the first axial direction (X-axis direction). The second RF inspection plane 2122 and the second transmission inspection planes 2212 may be disposed on a second row R2 which is parallel to the first axial direction (X-axis direction). The first row R1 and the second row R2 may be disposed to be spaced apart from each other in the second axial direction (Y-axis direction). Accordingly, the substrate connector 1 according to the first example may be suitably implemented such that an inspection operation in which the inspection instrument simultaneously inspects the first RF contact 211 and the first transmission contacts 221 and an inspection operation in which the inspection instrument simultaneously inspects the second RF contact 212 and the second transmission contacts 222 are individually performed. In addition, the substrate connector 1 according to the first example may be suitably implemented such that an inspection operation in which the inspection instrument simultaneously inspects the first RF contact 211, the first transmission contacts 221, the second RF contact 212 and the second transmission contacts 222 is performed. Accordingly, the substrate connector 1 according to the first example is implemented such that the inspection instrument can inspect the first RF contact 211, the first transmission contacts 221, the second RF contact 212 and the second transmission contacts 222 in various inspection methods according to the inspection conditions, inspection environment and the like.

As illustrated in FIGS. 5, 9 and 14, the first transmission inspection planes 2212 may be disposed on the first row R1. The second transmission inspection planes 2222 may be disposed on the second row R2. The first RF inspection plane 2112 and the second RF inspection plane 2122 may be disposed on a third row R3 which is parallel to the first axial direction (X-axis direction). The first row R1, the second row R2 and the third row R3 may be disposed to be spaced apart from each other in the second axial direction (Y-axis direction). Accordingly, the substrate connector 1 according to the first example is implemented such that the inspection instruments can inspect the first RF contact, the first transmission contacts 221, the second RF contact 212 and the second transmission contacts 222 in more various inspection methods according to the inspection conditions, inspection environment and the like. FIG. 14 illustrates that the third row R3 is disposed in the middle on the basis of the second axial direction (Y-axis direction), but is not limited thereto, and the first row R1 or the second row R2 may be disposed in the middle.

Next, the first ground contact 250 may be implemented as follows.

Referring to FIGS. 2 to 14, the first ground contact 250 may include a 1-1 ground contact 251 and a 1-2 ground contact 252.

The 1-1 ground contact 251 is disposed between the first RF contact 211 and the first transmission contacts 221 on the basis of the first axial direction (X-axis direction). Accordingly, the 1-1 ground contact 251 may shield between the first RF contact 211 and the first transmission contacts 221.

The 1-1 ground contact 251 may include a 1-1 ground inspection plane 2511.

The 1-1 ground inspection plane 2511 is for the inspection instrument to come into contact. The inspection instrument may perform an inspection on the 1-1 ground contact 251 in a state of being in contact with the 1-1 ground inspection plane 2511. The 1-1 ground inspection plane 2511 may be formed as a flat surface. Accordingly, since the substrate connector 200 according to the first example may secure an area for the inspection instrument to contact the 1-1 ground contact 251 using the 1-1 ground inspection plane 2511, it is possible to improve the ease and accuracy of the contact between the inspection instrument and the 1-1 ground contact 251. Accordingly, in the substrate connector 200 according to the first example, the accuracy of the inspection result for the 1-1 ground contact 251 may be improved by using the 1-1 ground inspection plane 2511. Further, in comparison with the comparative example in which the surface of the 1-1 ground contact 251 for contacting the inspection instrument is formed as a curved surface, since the 1-1 ground inspection plane 2511 is formed as a flat surface, the substrate connector 200 according to the first example is implemented to prevent slip or the like from occurring while the inspection instrument is in contact with the 1-1 ground inspection plane 2511. Accordingly, the substrate connector 1 according to the first example may improve the contact reliability between the inspection instrument and the 1-1 ground contact 251.

When the width H (illustrated in FIGS. 7 and 8) on the basis of the first axial direction (X-axis direction) of the 1-1 ground inspection plane 2511 is 1, it may be formed as a plane having the length L (illustrated in FIGS. 7 and 8) of 0.5 or more on the basis of the second axial direction (Y-axis direction). When the width H (illustrated in FIGS. 7 and 8) on the basis of the first axial direction (X-axis direction) of the 1-1 ground inspection plane 2511 is 1, it may be formed as a plane having the length L (illustrated in FIGS. 7 and 8) of 1.5 or less on the basis of the second axial direction (Y-axis direction). When the width H (illustrated in FIGS. 7 and 8) on the basis of the first axial direction (X-axis direction) of the 1-1 ground inspection plane 2511 is 1, it may be formed as a plane having the length L (illustrated in FIGS. 7 and 8) of 0.5 or more to 1.5 or less on the basis of the second axial direction (Y-axis direction). That is, the 1-1 ground inspection plane 2511 may be formed as a plane in which the ratio of the length L to the width H is 0.5 or more to 1.5 or less. Accordingly, the substrate connector 200 according to the first example may not only secure an area for the inspection instrument to contact the 1-1 ground contact 251 using the 1-1 ground inspection plane 2511, but also it is possible to realize miniaturization by reducing the overall size.

The 1-1 ground contact 251 may include a 1-1 ground mounting member 2512.

The 1-1 ground mounting member 2512 is for mounting on the first substrate. The 1-1 ground contact 251 may be electrically connected to the first substrate through the 1-1 ground mounting member 2512. The 1-1 ground mounting member 2512 may be formed to have a length that can be connected to the ground housing 230 based on the second axis direction (Y-axis direction). In this case, the 1-1 ground mounting member 2512 may be connected to a sidewall of the ground housing 230. The 1-1 ground mounting member 2512 may be formed in a plate shape disposed in the horizontal direction.

The 1-1 ground contact 251 may include a 1-1 ground connecting member 2513.

The 1-1 ground connecting member 2513 is for connecting to a ground contact of the counterpart connector. As the 1-1 ground connecting member 2513 is connected to a ground contact of the counterpart connector, the 1-1 ground contact 251 may be electrically connected to a transmission contact of the counterpart connector. Accordingly, the shielding power of the 1-1 ground contact 251 with respect to the first RF contacts 211 may be strengthened. The 1-1 ground connecting member 2513 may be connected to the 1-1 ground mounting member 2512. The 1-1 ground connecting member 2513 may be directly coupled to the 1-1 ground mounting member 2512. The 1-1 ground connecting member 2513 may be coupled to another member of the 1-1 ground connecting member 2513 and may be connected to the 1-1 ground mounting member 2512 through the member. The 1-1 ground connecting member 2513 may be formed in a plate shape disposed in a vertical direction. The 1-1 ground connecting member 2513 may be implemented in a form where a plate material disposed in a vertical direction and a plate material disposed in a horizontal direction are combined through bending processing of the plate material. Meanwhile, the 1-1 ground inspection plane 2511 may be formed on the 1-1 ground mounting member 2512 or the 1-1 ground connecting member 2513.

The 1-1 ground contact 251 may include a 1-1 ground inspection member 2514.

The 1-1 ground inspection member 2514 is for contacting the inspection instrument. In this case, as illustrated in FIG. 6, the 1-1 ground inspection plane 2511 may be formed on the 1-1 ground inspection member 2514. The 1-1 ground inspection plane 2511 may be formed on a surface of the 1-1 ground inspection member 2514 facing the inner space 230*a*. The 1-1 ground inspection member 2514 may be coupled to each of the 1-1 ground connecting member 2513 and the 1-1 ground mounting member 2512. In this case, the 1-1 ground inspection member 2514 has a connection function for connecting the 1-1 ground connecting member 2513 and the 1-1 ground mounting member 2512 and a contact function for the inspection instrument. The 1-1 ground inspection member 2514 may be coupled to the 1-1 ground connecting member 2513 or the 1-1 ground mounting member 2512. In this case, the 1-1 ground inspection member 2514 may have a support function supported by the insulation unit 240 and a contact function for the inspection instrument. Although not illustrated, even when the 1-1 ground inspection member 2514 is provided, the 1-1 ground inspection plane 2511 may be formed on the 1-1 ground mounting member 2512 or the 1-1 ground connecting member 2513. In this case, the 1-1 ground inspection member 2514 may have a support function for the insulation unit 240 or a connection function for connecting the 1-1 ground connecting member 2513 and the 1-1 ground mounting member 2512.

Meanwhile, when the 1-1 ground inspection plane 2511 is formed in a portion of the 1-1 ground contact 251 that is covered by the insulation unit 240, an inspection connection window (not illustrated) may be formed on the insulation unit 240. Accordingly, the 1-1 ground inspection plane 2511 may be disposed to be exposed to the inner space 230*a* without being covered by the insulation unit 240 through the inspection connection window.

Next, the 1-2 ground contact 252 may be implemented as follows.

Referring to FIGS. 2 to 14, the 1-2 ground contact 252 may include a 1-2 ground inspection plane 2521. The 1-2 ground inspection plane 2521 is for the inspection instrument to contact. Since the 1-2 ground inspection plane 2521 is implemented to substantially coincide with the 1-1 ground inspection plane 2511 of the 1-1 ground contact 251 as described above, the detailed description thereof will be omitted.

The 1-2 ground contact 252 may include a 1-2 ground mounting member 2522. The 1-2 ground mounting member 2522 is for mounting on the first substrate. Since the 1-2 ground mounting member 2522 is implemented to substantially coincide with the 1-1 ground mounting member 2512 of the 1-1 ground contact 251 as described above, the detailed description thereof will be omitted.

The 1-2 ground contact 252 may include a 1-2 ground connecting member 2523. The 1-2 ground connecting member 2523 is for being connected to a ground contact of the counterpart connector. Since the 1-2 ground connecting member 2523 is implemented to substantially coincide with the 1-1 ground connecting member 2513 of the 1-1 ground contact 251 as described above, the detailed description thereof will be omitted. The 1-2 ground inspection plane 2521 may be formed on the 1-2 ground mounting member 2522 or the 1-2 ground connecting member 2523.

The 1-2 ground contact 252 may include a 1-2 ground inspection member 2524. The 1-2 ground inspection member 2524 is for contacting the inspection instrument. Since the 1-2 ground inspection member 2524 is implemented to substantially coincide with the 1-1 ground inspection member 2514 of the 1-1 ground contact 251 as described above, the detailed description thereof will be omitted. The 1-2 ground inspection plane 2521 may be formed on any one of the 1-2 ground inspection member 2524, the 1-2 ground connecting member 2523 and the 1-2 ground mounting member 2522.

As illustrated in FIGS. 10 to 13, the 1-2 ground inspection plane 2521 and the 1-1 ground inspection plane 2511 may be disposed on a plane having the same height. Accordingly, since the height at which the inspection instrument is raised and lowered to contact each of the 1-2 ground inspection plane 2521 and the 1-1 ground inspection plane 2511 may be implemented to be the same, the substrate connector 1 according to the first example may further improve the ease and accuracy of the inspection operation of the 1-1 ground contact 251 and the 1-2 ground contact 252. Further, in the substrate connector 1 according to the first example, since it is possible for the inspection instrument to contact the 1-2 ground inspection plane 2521 and the 1-1 ground inspection plane 2511 at the same time, it may contribute to shortening the time taken to perform the inspection operation of the 1-1 grounded contact 251 and the 1-2 grounded contact 252. Meanwhile, the portion of the 1-2 ground contact 252 on which the 1-2 ground inspection plane 2521 is formed and the portion of the 1-1 ground contact 251 on which the 1-1 ground inspection plane 2511 is formed may have the same function as each other.

As illustrated in FIGS. 10 and 11, the 1-2 ground inspection plane 2521, the 1-1 ground inspection plane 2511, the second RF inspection plane 2122, the first RF inspection plane 2112, the second transmission inspection planes 2222 and the first transmission inspection planes 2212 may be disposed on a plane having the same height. Accordingly, since the height at which the inspection instrument is raised or lowered to be in contact with each of the 1-2 ground inspection plane 2521, the 1-1 ground inspection plane 2511, the second RF inspection plane 2122, the first RF inspection plane 2112, the second transmission inspection planes 2222 and the first transmission inspection planes 2212 may be implemented to be the same, the substrate connector 1 according to the first example may further improve the ease and accuracy of the inspection operation for the 1-2 ground contact 252, the 1-1 ground contact 251, the second RF contact 212, the first RF contact 211, the second transmission contacts 222 and the first transmission contacts 221. Further, in the substrate connector 1 according to the first example, since it is possible for the inspection instrument to simultaneously contact the 1-1 ground inspection plane 2521, the 1-1 ground inspection plane 2511, the second RF inspection plane 2122, the first RF inspection plane 2112, the second transmission inspection plane 2222 and the first transmission inspection planes 2212, it may contribute to shortening the time taken to perform the inspection operation for the 1-2 ground contact 252, the 1-1 ground contact 251, the second RF contact 212, the first RF contact 211, the second transmission contacts 222 and the first transmission contacts 221.

As illustrated in FIGS. 12 and 13, the first RF inspection plane 2112 and the second RF inspection plane 2122 may be disposed at a higher position than the 1-1 ground inspection plane 2511 and the 1-2 ground inspection plane 2521. Although not illustrated, the first RF inspection plane 2112 and the second RF inspection plane 2122 may be disposed at a lower position than the 1-1 ground inspection plane 2511 and the 1-2 ground inspection plane 2521.

As illustrated in FIGS. 5 and 6, the 1-1 ground inspection plane 2511 and the first transmission inspection planes 2212 may be disposed on the first row R1. The 1-2 ground inspection plane 2521 and the second transmission inspection plane 2222 may be disposed on the second row R2. Accordingly, the substrate connector 1 according to the first example is implemented such that the inspection instrument can inspect the 1-1 ground contact 251, the first transmission contacts 221, the 1-2 ground contact 252 and the second transmission contacts 222 in various inspection methods according to the inspection conditions, inspection environment and the like.

In this case, the first RF inspection plane 2112 may be disposed on the first row R1, and the second RF inspection plane 2122 may be disposed on the second row R2. Accordingly, the substrate connector 1 according to the first example is implemented such that the inspection instrument can inspect the first RF contact 211, the 1-1 ground contact 251, the first transmission contacts 221, the second RF contact 212, the 1-2 ground contact 252 and the second transmission contacts 222 in various inspection methods according to the inspection conditions, inspection environment and the like.

As illustrated in FIGS. 5, 9 and 14, the first RF inspection plane 2112 and the second RF inspection plane 2122 may be disposed on the third row R3. Accordingly, the substrate connector 1 according to the first example is implemented such that the inspection instrument can inspect the first RF contact 211, the 1-1 ground contact 251, the first transmission contacts 221, the second RF contact 212, the 1-1 ground contact 252 and the second transmission contacts 222 in more various inspection methods according to the inspection conditions, inspection environment and the like.

Next, the second ground contact 260 may be implemented as follows.

Referring to FIGS. 2 to 14, the second ground contact 260 may include a 2-1 ground contact 261 and a 2-2 ground contact 262.

The 2-1 ground contact 261 is disposed between the second RF contact 212 and the first transmission contacts 221 on the basis of the first axial direction (X-axis direction). Accordingly, the 2-1 ground contact 261 may shield between the second RF contact 212 and the first transmission contact 221.

The 2-1 ground contact 261 may include a 2-1 ground inspection plane 2611, a 2-1 ground mounting member 2612 and a 2-1 ground connecting member 2613. The 2-1 ground contact 261 may further include a 2-1 ground inspection member 2614. The 2-1 ground inspection plane 2611 may be formed on any one of the 2-1 ground mounting member 2612, the 2-1 ground connecting member 2613 and the 2-1 ground inspection member 2614. Since the 2-1 ground inspection plane 2611, the 2-1 ground mounting member 2612, the 2-1 ground connecting member 2613 and the 2-1 ground inspection member 2614 may be implemented to respectively coincide with the 1-1 ground inspection plane 2511, the 1-1 ground mounting member 2512, the 1-1 ground connecting member 2513 and the 1-1 ground inspection member 2514, the detailed descriptions thereof will be omitted.

The 2-1 ground contact 261 and the 1-1 ground contact 251 may be formed in the same shape as each other. Accordingly, the substrate connector 200 according to the first example may improve the ease of manufacturing operations for manufacturing each of the 2-1 ground contact 261 and the 1-1 ground contact 251. In this case, the 2-1 ground contact 261 and the 1-1 ground contact 251 may be arranged to be point-symmetric with respect to a symmetry point SP (illustrated in FIGS. 6 and 9). The symmetry point SP is a point which is spaced apart by the same distance from each of both side walls 230*b*, 230*c* (illustrated in FIG. 15) of the ground housing 230 disposed to be spaced apart from each other on the basis of the first axial direction (X-axis direction), and additionally is spaced apart by the same distance from each of both side walls 230*d*, 230*e* (illustrated in FIG. 15) of the ground housing 230 disposed to be spaced apart from each other on the basis of the second axial direction (Y-axis direction). Therefore, since the substrate connector 200 according to the first example is implemented such that the 2-1 ground contact 261 and the 1-1 ground contact 251 are formed in the same shape as each other with only different arrangement directions, the ease of manufacturing operations for manufacturing the 2-1 ground contact 261 and the 1-1 ground contact 251 may be further improved. In this case, the second RF contact 212 and the first RF contact 211 may be arranged to be point-symmetric with respect to the symmetry point SP.

The second 2-2 ground contact 262 is disposed between the second RF contact 212 and the second transmission contacts 222 on the basis of the first axial direction (X-axis direction). Accordingly, the 2-2 ground contact 262 may shield between the second RF contact 212 and the second transmission contacts 222.

The 2-2 ground contact 262 may include a 2-2 ground inspection plane 2621, a 2-2 ground mounting member 2622 and a 2-2 ground connecting member 2623. The 2-2 ground contact 262 may further include a 2-2 ground inspection member 2624. The 2-2 ground inspection plane 2621 may be formed on any one of the 2-2 ground mounting member 2622, the 2-2 ground connecting member 2623 and the 2-2 ground inspection member 2624. Since the 2-2 ground inspection plane 2621, the 2-2 ground mounting member 2622, the 2-2 ground connecting member 2623 and the 2-2 ground inspection member 2624 may be implemented to respectively substantially coincide with the 1-2 ground inspection plane 2521, the 1-2 ground mounting member 2522, the 1-2 ground connecting member 2523 and the 1-2 ground inspection member 2524, the detailed descriptions thereof will be omitted.

The 2-2 ground contact 262 and the 1-2 ground contact 252 may be formed to in the same shape as each other. Accordingly, the substrate connector 200 according to the first example may improve the ease of manufacturing operations of manufacturing each of the 2-2 ground contact 262 and the 1-2 ground contact 252. In this case, the 2-2 ground contact 262 and the 1-2 ground contact 252 may be arranged to be point-symmetrical with respect to the symmetry point SP (illustrated in FIGS. 6 and 9) as a reference. The 2-2 ground contact 262, the 1-2 ground contact 252, the 2-1 ground contact 261 and the 1-1 ground contact 251 may all be formed in the same shape as each other.

Referring to FIGS. 2 to 16, in the substrate connector 200 according to the first example, the ground housing 230 may be implemented as follows.

The ground housing 230 may include a ground inner wall 231, an outer ground wall 232 and a ground connection wall 233.

The ground inner wall 231 faces the insulation unit 240. The ground inner wall 231 may be disposed to face the inner space 230*a*. The 1-1 ground contact 251 and the 2-1 ground contact 261 may be respectively connected to the inner ground wall 231. The ground inner wall 231 may be disposed to surround all sides with respect to the inner space 230*a*. Although not illustrated, the ground inner wall 231 may include a plurality of sub-ground inner walls such that the sub-ground inner walls are implemented to be disposed on different sides with respect to the inner space 230*a*. In this case, the sub-ground inner walls may be spaced apart from each other.

The ground inner wall 231 may be connected to a ground housing of a counterpart connector inserted into the inner space 230*a*. For example, as illustrated in FIG. 16, the ground inner wall 231 may be connected to the ground housing 330 of the counterpart connector. In this way, the substrate connector 200 according to the first example may further strengthen the shielding function through the connection between the ground housing 230 and the ground housing of the counterpart connector. In addition, the substrate connector 200 according to the first example may reduce electrical adverse effects such as crosstalk and the like that may be generated by capacitance or induction between adjacent terminals through a connection between the ground housing 230 and the ground housing of the counterpart connector. In this case, since the substrate connector 200 according to the first example may secure a path through which electromagnetic waves are introduced into at least one ground of the first substrate and the second substrate, the EMI shielding performance may be further strengthened.

The ground outer wall 232 is spaced apart from the ground inner wall 231. The ground outer wall 232 may be disposed outside the ground inner wall 231. The ground outer wall 232 may be disposed to surround all sides with respect to the ground inner wall 231. The ground outer wall 232 and the ground inner wall 231 may be implemented as a shielding wall surrounding the side of the inner space 230*a*. The first RF contact 211 and the second RF contact 212 may be located in the inner space 230*a* surrounded by the shielding wall. Accordingly, the ground housing 230 may implement a shielding function for the RF contacts 210 using a shielding wall. Therefore, the substrate connector 200 according to the first example may contribute to further improving EMI shielding performance and EMC performance by using the shielding wall.

The ground outer wall 232 may be grounded by being mounted on the first substrate. In this case, the ground housing 230 may be grounded through the ground outer wall 232. When one end of the ground outer wall 232 is coupled to the ground connection wall 233, the other end of the ground outer wall 232 may be mounted on the first substrate. In this case, the ground outer wall 232 may be formed to have a higher height than the ground inner wall 231.

The ground connection wall 233 is coupled to each of the ground inner wall 231 and the ground outer wall 232. The ground connection wall 233 may be disposed between the ground inner wall 231 and the ground outer wall 232. The ground inner wall 231 and the ground outer wall 232 may be electrically connected to each other through the ground connection wall 233. Accordingly, when the grounding outer wall 232 is mounted on the first substrate and grounded, the grounding connection wall 233 and the ground inner wall 231 are also grounded to implement a shielding function.

The ground connection wall 233 may be coupled to one end of the ground outer wall 232 and one end of the ground inner wall 231, respectively. Based on FIG. 16, one end of the grounded outer wall 232 may correspond to the upper end of the grounded outer wall 232, and one end of the grounded inner wall 231 may correspond to the upper end of the grounded inner wall 231. The ground connection wall 233 may be formed in a plate shape disposed in a horizontal direction, and the ground outer wall 232 and the ground inner wall 231 may be formed in a plate shape disposed in a vertical direction, respectively. The ground connection wall 233, the ground outer wall 232 and the ground inner wall 231 may be integrally formed.

The ground connection wall 233 may be connected to a ground housing of a counterpart connector inserted into the inner space 230*a*. Accordingly, in the substrate connector 200 according to the first example, since the ground outer wall 232 and the ground connection wall 233 are connected to the ground housing of the counterpart connector, the shielding function may be further strengthened by increasing the contact area between the ground housing 230 and the ground housing of the counterpart connector.

The ground floor 234 protrudes from the lower end of the ground inner wall 231 toward the inner space 230*a*. That is, the ground floor 234 may protrude to the inside of the ground inner wall 231. The ground floor 234 may extend along the lower end of the ground inner wall 231 to be formed in a closed ring shape. The ground floor 234 may be grounded by being mounted on the first substrate. In this case, the ground housing 330 may be grounded through the ground floor 234. When the counterpart connector is inserted into the inner space 230*a*, the grounding floor 234 may be connected to a grounding housing of the counterpart connector. The ground floor 234 may be formed in a plate shape arranged in a horizontal direction.

Herein, the ground housing 230 may implement a shielding function for the first RF contact 211 together with the first ground contact 250. The ground housing 230 may implement a shielding function for the second RF contact 212 together with the second ground contact 260.

Figure 15:
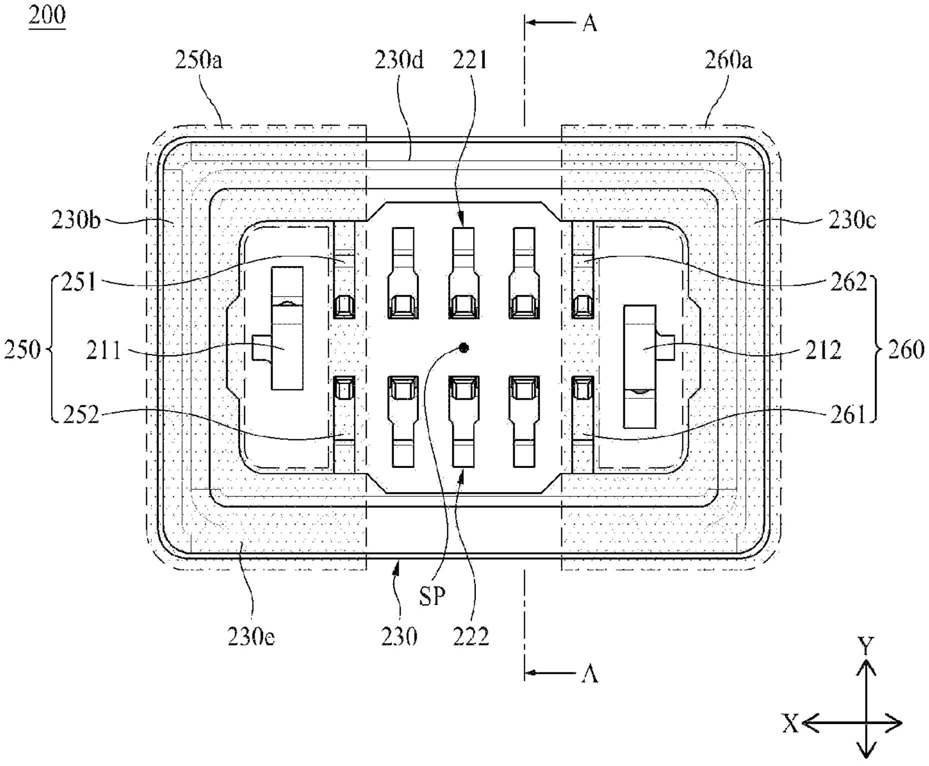
FIG. 15 is a conceptual plan view for explaining a ground loop in the substrate connector according to the first example.

In this case, as illustrated in FIG. 15, the ground housing 230 may include a first shielding wall 230*b*, a second shielding wall 230*c*, a third shielding wall 230*d* and a fourth shielding wall 230*e*. The first shielding wall 230*b*, the second shielding wall 230*c*, the third shielding wall 230*d* and the fourth shielding wall 230*e* may be respectively implemented by the ground inner wall 231, the ground outer wall 232 and the ground connection wall 233. The first shielding wall 230*b* and the second shielding wall 230*c* are disposed to face each other on the basis of the first axial direction (X-axis direction). The first RF contact 211 and the second RF contact 212 may be positioned between the first shielding wall 230*b* and the second shielding wall 230*c* on the basis of the first axial direction (X-axis direction). Based on the first axial direction (X-axis direction), the first RF contact 211 may be located at a position where the distance away from the first shielding wall 230*b* is shorter than the distance away from the second shielding wall 230*c*. Based on the first axial direction (X-axis direction), the second RF contact 212 may be located at a position where the distance away from the second shielding wall 230*c* is shorter than the distance away from the first shielding wall 230*b*. The third shielding wall 230*d* and the fourth shielding wall 230*e* are disposed to face each other on the basis of the second axial direction (Y-axis direction). The first RF contact 211 and the second RF contact 212 may be positioned between the third shielding wall 230*d* and the fourth shielding wall 230*e* on the basis of the second axial direction (Y-axis direction).

The first ground contact 250 may be positioned between the first RF contact 211 and the transmission contacts 220 on the basis of the first axial direction (X-axis direction). Accordingly, the first RF contact 211 may be positioned between the first shielding wall 230*b* and the first ground contact 250 on the basis of the first axial direction (X-axis direction), and may be positioned between the third shielding wall 230*d* and the fourth shielding wall 230*e* on the basis of the second axial direction (Y-axis direction). Accordingly, the substrate connector 200 according to the first example may use the first ground contact 250, the first shielding wall 230*b*, the third shielding wall 230*d* and the fourth shielding wall 230*e* to strengthen the shielding function for the first RF contact 211. The first ground contact 250, the first shielding wall 230*b*, the third shielding wall 230*d* and the fourth shielding wall 230*e* may be disposed on four sides with respect to the first RF contact 211 to implement the shielding power against RF signals. In this case, the first ground contact 250, the first shielding wall 230*b*, the third shielding wall 230*d* and the fourth shielding wall 230*e* may implement the first ground loop 250*a* (illustrated in FIG. 15) for the first RF contact 211. Therefore, the substrate connector 200 according to the first example may further strengthens the shielding function for the first RF contact 211 by using the first ground loop 250*a* to realize complete shielding for the first RF contact 211.

The second ground contact 260 may be positioned between the second RF contact 212 and the transmission contacts 220 on the basis of the first axial direction (X-axis direction). Accordingly, the second RF contact 212 may be positioned between the second shielding wall 230*c* and the second ground contact 260 on the basis of the first axial direction (X-axis direction), and may be positioned between the third shielding wall 230*d* and the fourth shielding wall 230*e* on the basis of the second axial direction (Y-axis direction). Accordingly, the substrate connector 200 according to the first example may use the second ground contact 260, the second shielding wall 230*c*, the third shielding wall 230*d* and the fourth shielding wall 230*e* to strengthen the shielding function for the second RF contact 212. The second ground contact 260, the second shielding wall 230*c*, the third shielding wall 230*d* and the fourth shielding wall 230*e* may be disposed on four sides with respect to the second RF contact 212 to implement the shielding power against RF signals. In this case, the second ground contact 260, the second shielding wall 230*c*, the third shielding wall 230*d* and the fourth shielding wall 230*e* may implement the second ground loop 260*a* (illustrated in FIG. 15) for the second RF contact 212. Therefore, the substrate connector 200 according to the first example may further strengthen the shielding function for the second RF contact 212 using the second ground loop 260*a*, to realize complete shielding for the second RF contact.

Referring to FIGS. 2 to 16, in the substrate connector 200 according to the first example, the insulation unit 240 may be implemented as follows.

The insulation unit 240 may include an insulating member 241, an insertion member 242 and a connecting member 243.

The insulating member 241 supports the RF contacts 210 and the transmission contacts 220. The insulating member 241 may be positioned in the inner space 230*a*. The insulating member 241 may be positioned inside the ground inner wall 231. The insulating member 241 may be inserted into an inner space of the counterpart connector.

The insertion member 242 is inserted between the ground inner wall 231 and the ground outer wall 232. As the insertion member 242 is inserted between the ground inner wall 231 and the ground outer wall 232, the insulation unit 240 may be coupled to the ground housing 230. The insertion member 242 may be inserted between the ground inner wall 231 and the grounding outer wall 232 by the interference fit method. The insertion member 242 may be disposed outside the insulating member 241. The insertion member 242 may be disposed to surround the outside of the insulating member 241.

The connecting member 243 is coupled to each of the insertion member 242 and the insulating member 241. The insertion member 242 and the insulating member 241 may be connected to each other through the connecting member 243. Based on the vertical direction, the connecting member 243 may be formed to have a thinner thickness than that of the inserting member 242 and the insulating member 241. Accordingly, a space is provided between the insertion member 242 and the insulating member 241, and the counterpart connector may be inserted into the space. The connecting member 243, the inserting member 242 and the connecting member 243 may be integrally formed.

The insulation unit 240 may include a soldering inspection window 244 (illustrated in FIG. 4).

The soldering inspection window 244 may be formed through the insulation unit 240. The soldering inspection window 244 may be used to inspect a state in which the RF mounting members 2111, 2121 are mounted on the first substrate. In this case, the RF contacts 210 may be coupled to the insulation unit 240 such that the RF mounting members 2111, 2121 are positioned on the soldering inspection window 244. Accordingly, the RF mounting members 2111, 2121 are not covered by the insulation unit 240. Therefore, in a state where the substrate connector 200 according to the first example is mounted on the first board, the operator may inspect the mounted state of the RF mounting members 2111, 2121 on the first substrate through the soldering inspection window 244. Accordingly, in the substrate connector 200 according to the first example, even if all of the RF contacts 210 including the RF mounting members 2111, 2121 are positioned inside the ground housing 230, it is possible to improve the accuracy of the mounting operation of mounting the RF contacts 210 on the first substrate. The soldering inspection window 244 may be formed through the insulating member 241.

The insulation unit 240 may include a plurality of the soldering inspection windows 244. In this case, the RF mounting members 2111, 2121 may be positioned in different soldering inspection windows 244. The transmission mounting members 2211, 2221 may be positioned in some of the soldering inspection windows 244. The ground mounting members 2512, 2522, 2612, 2622 may be positioned in some of the soldering inspection windows 244. Therefore, in a state where the substrate connector 200 according to the first example is mounted on the first substrate, the operator may inspect the mounting state of the RF mounting members 2111, 2121, the transmission mounting members 2211, 2221 and the ground mounting members 2512, 2522, 2612, 2622 on the first substrate through the soldering inspection windows 244. Accordingly, the substrate connector 200 according to the first example may improve the accuracy of the operation of mounting the RF mounting members 2111, 2121, the transmission mounting members 2211, 2221 and the ground mounting members 2512, 2522, 2612, 2622 on the first substrate. The soldering inspection windows 244 may be formed to pass through the insulation unit 240 at positions spaced apart from each other.

Substrate Connector 300 According to the Second Example

Referring to FIGS. 2 to 20, the substrate connector 300 according to the second example may be mounted on the second substrate. When the substrate connector 300 according to the second example and the counterpart connector are assembled to be coupled to each other, the second substrate on which the substrate connector 300 according to the second example is mounted and the first substrate on which the counterpart connector is mounted may be electrically connected to each other. In this case, the counterpart connector may be implemented as the substrate connector 200 according to the first example. Meanwhile, the counterpart connector in the substrate connector 200 according to the first example may be implemented as the substrate connector 300 according to the second example.

The substrate connector 300 according to the second example may include a plurality of RF contacts 310, a plurality of transmission contacts 220, a ground housing 330, an insulation unit 340, a first ground contact 350 and a second ground contact 360. Since the RF contacts 310, the transmission contacts 220, the ground housing 330, the insulation unit 340, the first ground contact 350 and the second ground contact 360 may be implemented to substantially coincide with the RF contacts 210, the transmission contacts 220, the ground housing 230, the insulation unit 240, the first ground contact 250 and the second ground contact 260 in the substrate connector 200 according to the first example as described above, respectively, the differences will be mainly described below.

A first RF contact 311 of the RF contacts 310 and a second RF contact 312 of the RF contacts 310 may be supported in the insulation unit 340 at a position which is spaced apart from each other in the first axial direction (X-axis direction).

The first RF contact 311 includes a first RF mounting member 3111 for mounting on the second substrate, a first RF inspection plane 3112 for contacting the inspection instrument and a first RF connecting member 3113 for contacting an RF contact of the counterpart connector. The first RF contact 311 may include a plurality of first RF mounting members 3111, 3111' (illustrated in FIG. 20). The first RF contact 311 may further include a first RF inspection member 3114 for contacting the inspection instrument. Since the first RF mounting member 3111, the first RF inspection plane 3112, the first RF connecting member 3113 and the first RF inspection member 3114 may be implemented to substantially coincide with the first RF mounting member 2111, the first RF inspection plane 2112, the first RF connecting member 2113 and the first RF inspection member 2114 in the substrate connector according to the first example as described above, respectively, the detailed descriptions thereof will be omitted.

The second RF contact 312 may include a second RF mounting member 3121 for mounting on the second substrate, a second RF inspection plane 3122 for contacting the inspection instrument, and a second RF connecting member 3123 for connecting to an RF contact of the counterpart connector. The second RF contact 312 may include a plurality of second RF mounting members 3121, 3121' (illustrated in FIG. 20). The second RF contact 312 may further include a second RF inspection member 3124 for contacting the inspection instrument. Since the second RF mounting member 3121, the second RF inspection plane 3122, the second RF connecting member 3123 and the second RF inspection member 3124 may be implemented to substantially coincide with the second RF mounting member 2121, the second RF inspection plane 2122, the second RF connecting member 2123 and the second RF inspection member 2124 in the substrate connector 200 according to the first example as described above, respectively, the detailed descriptions thereof will be omitted.

The transmission contacts 220 may be disposed between the first RF contact 311 and the second RF contact 312 on the basis of the first axial direction (X-axis direction). The first transmission contacts 321 of the transmission contacts 220 and the second transmission contacts 322 of the transmission contacts 220 may be disposed to be spaced apart from each other in the second axial direction (Y-axis direction).

The first transmission contacts 321 may be disposed to be spaced apart from each other in the first axial direction (X-axis direction). Each of the first transmission contacts 321 may include a first transmission mounting member 3211 for mounting on the second substrate, a first transmission inspection plane 3212 for contacting the inspection instrument, and a first transmission connecting member 3212 for connecting to a transmission contact of the counterpart connector. Each of the first transmission contacts 321 may further include a first transmission inspection member 3214 for contacting the inspection instrument. Since the first transmission mounting member 3211, the first transmission inspection plane 3212, the first transmission connecting member 3213 and the first transmission inspection member 3214 may be implemented to substantially coincide with the first transmission mounting member 2211, the first transmission inspection plane 2212, the first transmission connecting member 2213 and the first transmission inspection member 2214 in the substrate connector 200 according to the first example as described above, respectively, the detailed descriptions thereof will be omitted.

The second transmission contacts 322 may be disposed to be spaced apart from each other in the first axial direction (X-axis direction). Each of the second transmission contacts 322 may include a second transmission mounting member 3221 for mounting on the second substrate, a second transmission inspection plane 3222 for contacting the inspection instrument, and a second transmission connecting member 3223 for connecting to a transmission contact of the counterpart connector. The second transmission contacts 322 may further include a second transmission inspection member 3224 for contacting the inspection instrument. Since the second transmission mounting member 3221, the second transmission inspection plane 3222, the second transmission connecting member 3223 and the second transmission inspection member 3224 may be implemented to substantially coincide with the second transmission mounting member 2221, the second transmission inspection plane 2222, the second transmission connecting member 2223 and the second transmission inspection member 2224 in the substrate connector 200 according to the first example as described above, respectively, the detailed descriptions thereof will be omitted.

The ground housing 330 is coupled to the insulation unit 340. The ground housing 330 may be grounded by being mounted on the second substrate. The ground housing 330 may be disposed to surround the sides of the inner space 330*a*. The insulation unit 340 may be positioned in the inner space 330*a*. The first RF contact 311, the second RF contact 312, the transmission contacts 320, the first ground contact 250 and the second ground contact 260 may all be positioned in the inner space 330*a*. In this case, in each of the first RF contact 311, the second RF contact 312, the transmission contacts 320, the first ground contact 250 and the second ground contact 260, all of the parts mounted on the second substrate may be positioned in the inner space 330*a*. The counterpart connector may be inserted into the inner space 330*a*. In this case, a part of the counterpart connector may be inserted into the inner space 330*a*, and a part of the substrate connector 300 according to the second example may be inserted into the inner space of the counterpart connector. The ground housing 330 may be disposed to surround all sides with respect to the inner space 330*a*.

The insulation unit 340 supports the RF contacts 310. The RF contacts 310, the transmission contacts 320, the first ground contact 250, and the second ground contact 260 may be coupled to the insulation unit 340. In the insulation unit 340, the RF contacts 310, the transmission contacts 320, the first ground contact 250 and the second ground contact 260 may be coupled to the grounding housing 330 so as to be positioned in the inner space 330*a*.

The first ground contact 350 may implement a shielding function for the first RF contact 311 together with the ground housing 330. The first ground contact 350 may be disposed between the first RF contact 311 and the transmission contact 320 on the basis of the first axial direction (X-axis direction). When the counterpart connector is inserted into the inner space 330*a*, the first ground contact 350 may be connected to a ground contact of the counterpart connector.

The first ground contact 350 may include a 1-1 ground contact 351 and a 1-2 ground contact 352.

The 1-1 ground contact 351 is disposed between the first RF contact 311 and the first transmission contacts 321 on the basis of the first axial direction (X-axis direction). Accordingly, the 1-1 ground contact 351 may shield between the first RF contact 311 and the first transmission contact 321. The 1-1 ground contact 351 may include a 1-1 ground inspection plane 3511 for contacting the inspection instrument, a 1-1 ground mounting member 3512 for mounting on the second substrate, a 1-1 ground connecting member 3513 for connecting to a ground contact of the counterpart connector. The 1-1 ground contact 351 may include a plurality of 1-1 ground mounting members 3512. The 1-1 ground contact 351 may further include a 1-1 ground inspection member 3514 for contacting the inspection instrument. Since the 1-1 ground inspection plane 3511, the 1-1 ground mounting member 3512, the 1-1 ground connecting member 3513 and the 1-1 ground inspection member 3514 may be implemented to substantially coincide with the 1-1 ground inspection plane 2511, the 1-1 ground mounting member 2512, and the 1-1 ground connecting member 2513 and the 1-1 ground inspection member 2514 in the substrate connector 200 according to the first example as described above, respectively, the detailed descriptions thereof will be omitted.

The 1-2 ground contact 352 is disposed between the first RF contact 311 and the second transmission contact 322 on the basis of the first axial direction (X-axis direction). Accordingly, the 1-2 ground contact 352 may shield between the first RF contact 311 and the second transmission contact 322. The 1-2 ground contact 352 may include a 1-2 ground inspection plane 3521 for contacting the inspection instrument, a 1-2 ground mounting member 3522 for mounting on the second substrate, and a 1-2 first ground connecting member 3523 for connecting to a ground contact of the counterpart connector. The 1-2 ground contact 352 may include a plurality of 1-2 ground mounting members 3522. The 1-2 ground contact 352 may further include a 1-2 ground inspection member 3524 for contacting the inspection instrument. Since the 1-2 ground inspection plane 3521, the 1-2 ground mounting member 3522, the 1-2 ground connecting member 3523 and the 1-2 ground inspection member 3524 may be implemented to substantially coincide with the 1-2 ground inspection plane 2521, the 1-2 ground mounting member 2522, the 1-2 ground connecting member 2523 and the 1-2 ground inspection members 2524 in the substrate connector 200 according to the first example as described above, respectively, the detailed descriptions thereof will be omitted.

The second ground contact 360 may implement a shielding function for the second RF contact 312 together with the ground housing 330. The second ground contact 360 may be disposed between the second RF contact 312 and the transmission contacts 320 on the basis of the first axial direction (X-axis direction). When the counterpart connector is inserted into the inner space 330*a*, the second ground contact 360 may be connected to a ground contact of the counterpart connector.

The second ground contact 360 may include a 2-1 ground contact 361 and a 2-2 ground contact 362.

The 2-1 ground contact 361 is disposed between the second RF contact 312 and the second transmission contacts 322 on the basis of the first axial direction (X-axis direction). Accordingly, the 2-1 ground contact 361 may shield between the second RF contact 312 and the second transmission contact 322. The 2-1 ground contact 361 may include a 2-1 ground inspection plane 3611 for contacting the inspection instrument, a 2-1 ground mounting member 3612 for mounting on the second substrate, and a 2-1 ground connecting member 3613 for connecting to a ground contact of the counterpart connector. The 2-1 ground contact 361 may include a plurality of 2-1 ground mounting members 3612. The 2-1 ground contact 361 may further include a 2-1 ground inspection member 3614 for contacting the inspection instrument. Since the 2-1 ground inspection plane 3611, the 2-1 ground mounting member 3612, the 2-1 ground connecting member 3613 and the 2-1 ground inspection member 3614 may be implemented to substantially coincide with the 2-1 ground inspection plane 2611, the 2-1 ground mounting member 2612, the 2-1 ground connecting member 2613 and the 2-1 ground inspection member 2614 in the substrate connector according to the first example as described above, respectively, the detailed descriptions thereof will be omitted.

The second 2-2 ground contact 362 is disposed between the second RF contact 312 and the first transmission contacts 321 on the basis of the first axial direction (X-axis direction). Accordingly, the 2-2 ground contact 362 may shield between the second RF contact 312 and the first transmission contact 321. The 2-2 ground contact 362 may include a 2-2 ground inspection plane 3621 for contacting the inspection instrument, a 2-2 ground mounting member 3622 for mounting on the second substrate, and a 2-2 ground connecting member 3623 for connecting to a ground contact of the counterpart connector. The 2-2 ground contact 362 may include a plurality of the 2-2 ground mounting members 3622. The 2-2 ground contact 362 may further include a 2-2 ground inspection member 3624 for contacting the inspection instrument. Since the 2-2 ground inspection plane 3621, the 2-2 ground mounting member 3622, the 2-2 ground connecting member 3623 and the 2-2 ground inspection member 3624 may be implemented to substantially coincide with the 2-2 ground inspection plane 2621, the 2-2 ground mounting member 2622, the 2-2 ground connecting member 2623 and the 2-2 ground inspection member 2624 in the substrate connector 200 according to the first example as described above, respectively, the detailed descriptions thereof will be omitted.

Figure 20:
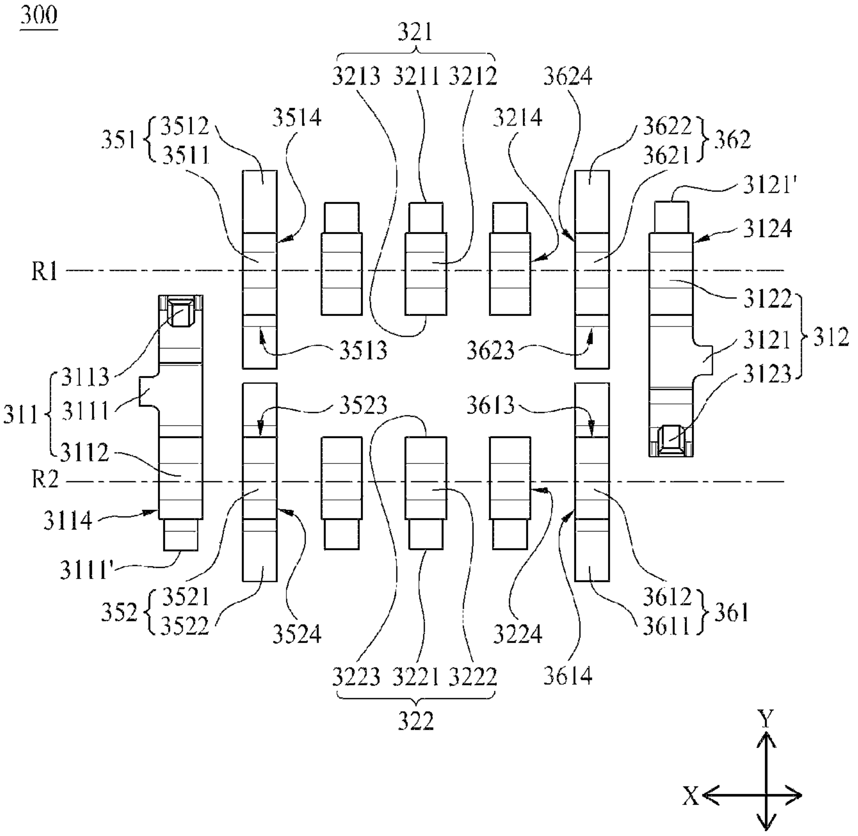
FIG. 20 is a schematic plan view of contacts in the substrate connector according to the second example.

In the substrate connector 300 according to the second example, as illustrated in FIG. 20, the 1-1 ground inspection plane 3511, the first transmission inspection planes 3212, the 2-2 ground inspection plane 3621 and the second RF inspection plane 3122 may be disposed on the first row R1. The first RF inspection plane 3112, the 1-2 ground inspection plane 3512, the second transmission inspection planes 3222 and the 2-1 ground inspection plane 3611 may be disposed on the second row R2. In the substrate connector 300 according to the second example, the inspection planes 3112, 3122, 3212, 3222, 3511, 3521, 3611, 3621 may be disposed as illustrated in FIG. 6, 9 or 14.

Referring to FIGS. 16 to 21, in the substrate connector 300 according to the second example, the ground housing 330 may be implemented as follows.

The ground housing 330 may include a ground side wall 331, a ground upper wall 332 and a ground lower wall 333.

The ground side wall 331 faces the insulation unit 240. The ground side wall 331 may be disposed to face the inner space 330*a*. The ground side wall 331 may be disposed to surround all sides of the inner space 330*a* as a reference.

The ground side wall 331 may be connected to a grounding housing of a counterpart connector inserted into the inner space 330*a*. For example, as illustrated in FIG. 16, the ground side wall 331 may be connected to a ground inner wall 231 of the ground housing 230 of the substrate connector 200 according to the first example. In this way, the substrate connector 300 according to the second example may further strengthen the shielding function through the connection between the ground housing 330 and the ground housing of the counterpart connector. In addition, the substrate connector 300 according to the second example may reduce electrical adverse effects such as crosstalk or the like that may be generated by capacitance or induction between adjacent terminals through the connection between the ground housing 330 and the ground housing of the counterpart connector. In this case, since the substrate connector 300 according to the second example may secure a path through which electromagnetic waves are introduced to at least one ground of the second substrate and the first substrate, the EMI shielding performance may be further strengthened.

The ground upper wall 332 is coupled to the ground side wall 331. The ground upper wall 332 may be coupled to one end of the ground side wall 331. The ground upper wall 332 may protrude from the ground side wall 331 toward the inner space 330*a*. The ground upper wall 332 may be connected to a ground housing of a counterpart connector inserted into the inner space 330*a*. Accordingly, in the substrate connector 300 according to the second example, since the ground upper wall 332 and the ground side wall 331 are connected to the ground housing of the counterpart connector, the shielding function may be further strengthened by increasing the contact area between the ground housing 330 and the ground housing of the counterpart connector. For example, as illustrated in FIG. 16, the ground upper wall 332 may be connected to the ground bottom 234 of the ground housing 230 of the substrate connector 200 according to the first example.

The ground lower wall 333 is coupled to the ground side wall 331. The ground lower wall 333 may be coupled to the other end of the ground side wall 331. The ground lower wall 333 may protrude from the ground side wall 331 to the opposite side of the inner space 330*a*. The ground lower wall 333 may be disposed to surround all sides with respect to the ground side wall 331. The ground lower wall 333 and the ground side wall 331 may be implemented as a shielding wall surrounding the side of the inner space 330*a*. The first RF contact 311 and the second RF contact 312 may be positioned in the inner space 330*a* surrounded by the shielding wall. Accordingly, the ground housing 330 may implement a shielding function for the RF contacts 310 using a shielding wall. Therefore, the substrate connector 300 according to the second example may contribute to further improving EMI shielding performance and EMC performance by using the shielding wall. The lower ground wall 333 may be grounded by being mounted on the second substrate. In this case, the ground housing 330 may be grounded through the ground lower wall 333.

The ground lower wall 333 and the ground upper wall 332 may be formed in a plate shape disposed in the horizontal direction, and the ground side wall 331 may be formed in a plate shape disposed in the vertical direction. The ground lower wall 333, the ground upper wall 332 and the ground side wall 331 may be integrally formed.

Herein, the ground housing 330 may implement a shielding function for the first RF contact 311 together with the first ground contact 350. The ground housing 330 may implement a shielding function for the second RF contact 312 together with the second ground contact 360.

Figure 21:
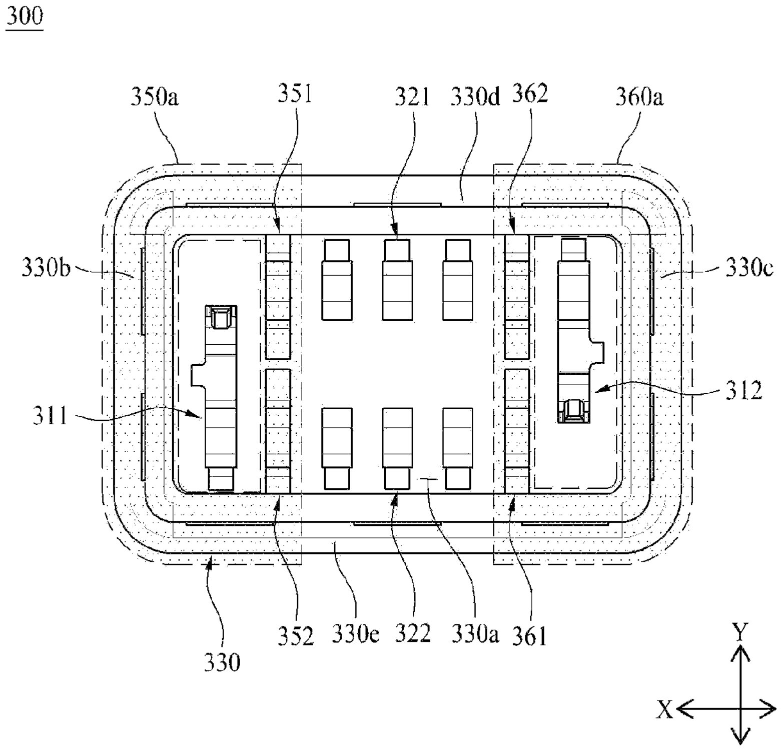
FIG. 21 is a conceptual plan view for explaining a ground loop in the substrate connector according to the second example.

In this case, as illustrated in FIG. 21, the ground housing 330 may include a first shielding wall 330*b*, a second shielding wall 330*c*, a third shielding wall 330*d* and a fourth shielding wall 330*e*. The first ground loop 350 may be implemented for the first ground contact 350, the first shielding wall 330*b*, the third shielding wall 330*d* and the fourth shielding wall 330*e*. The second group loop 360 may be implemented for the second ground contact 360, the second shielding wall 330*c*, the third shielding wall 330*d* and the fourth shielding wall 330*e*. Since the first shielding wall 330*b*, the second shielding wall 330*c*, the third shielding wall 330*d*, the fourth shielding wall 330*e*, the first ground loop 350*a* and the second ground 360*a* are implemented to substantially coincide with the first shielding wall 230*b*, the second shielding wall 230*c*, the third shielding wall 230*d*, the fourth shielding wall 240*d*, the first ground loop 250*a* and the second ground loop 260*a* in the substrate connector 200 according to the first example as described above, respectively, the detailed descriptions thereof will be omitted.

Referring to FIGS. 2 to 21, in the substrate connector 300 according to the second example, the insulation unit 340 may include a soldering inspection window 341 which is used to inspect a state of being mounted on the second board. Since the soldering inspection window 341 is implemented to substantially coincide with the soldering inspection window 244 in the substrate connector 200 according to the first example, the detailed description thereof will be omitted.

The present disclosure described above is not limited to the above-described exemplary embodiments and the accompanying drawings, and it will be apparent to those of ordinary skill in the art to which the present disclosure pertains that various substitutions, modifications and changes are possible within the scope that does not deviate from the technical spirit of the present disclosure.

The invention claimed is:

1. A substrate connector, comprising:

a plurality of radio frequency (RF) contacts for RF signal transmission;

an insulation unit for supporting the RF contacts;

a plurality of transmission contacts coupled to the insulation unit between a first RF contact and a second RF contact such that the first RF contact of the RF contacts and the second RF contact of the RF contacts are spaced apart from each other in a first axial direction;

a ground housing to which the insulation unit is coupled;

a first ground contact which is coupled to the insulation unit and shields the gap between the first RF contact and the transmission contacts on the basis of the first axial direction; and a second ground contact which is coupled to the insulation unit and shields the gap between the second RF contact and the transmission contacts on the basis of the first axial direction, wherein the first RF contact includes a first RF inspection plane with which an inspection instrument is to come in contact, wherein the second RF contact includes a second inspection plane with which the inspection instrument is to come in contact, and wherein the first RF inspection plane and the second RF inspection plane are arranged on a plane having the same height.

2. The substrate connector of claim 1, wherein when at least one of the first RF inspection plane and the second RF inspection plane has a width of 1 on the basis of the first axial direction, the substrate connector is formed in a plane having a length of 0.5 or more on the basis of the second axial direction which is perpendicular to the first axial direction.

3. The substrate connector of claim 1, wherein when at least one of the first RF inspection plane and the second RF inspection plane has a width of 1 on the basis of the first axial direction, the substrate connector is formed in a plane having a length of 1.5 or less on the basis of the second axial direction which is perpendicular to the first axial direction.

4. The substrate connector of claim 1, wherein first transmission contacts of the transmission contacts and second transmission contacts of the transmission contacts are spaced apart from each other along a second axial direction which is perpendicular to the first axial direction, wherein each of the first transmission contacts includes a first transmission inspection plane with which the inspection instrument is to come in contact, wherein each of the second transmission contacts includes a second transmission inspection plane with which the inspection instrument is to come in contact, and wherein the first transmission inspection planes and the second transmission inspection planes are arranged on a plane having the same height.

5. The substrate connector of claim 4, wherein the first RF inspection plane, the second RF inspection plane, the first transmission inspection planes and the second transmission inspection planes are arranged on a plane having the same height.

6. The substrate connector of claim 4, wherein the first RF inspection plane is disposed at a higher or lower position than the first transmission inspection planes, and wherein the second RF inspection plane is disposed at a higher or lower position than the second transmission inspection planes.

7. The substrate connector of claim 4, wherein the first RF inspection plane and the first transmission inspection planes are disposed on a first row which is parallel to the first axial direction, wherein the second RF inspection plane and the second transmission inspection planes are disposed on a second row which is parallel to the first axial direction, and wherein the first row and the second row are spaced apart from each other along the second axial direction.

8. The substrate connector of claim 4, wherein the first transmission inspection planes are disposed on a first row which is parallel to the first axial direction, wherein the second transmission inspection planes are disposed on a second row which is parallel to the first axial direction, wherein the first RF inspection plane and the second RF inspection plane are disposed on a third row which is parallel to the first axial direction, and wherein the first row, the second row and the third row are spaced apart from each other along the second axial direction.

9. The substrate connector of claim 4, wherein the first ground contact includes a 1-1 ground contact and a 1-2 ground contact which are disposed to be spaced apart from each other along the second axial direction, wherein the 1-1 ground contact includes a 1-1 ground inspection plane with which the inspection instrument is to come in contact, and wherein the 1-2 ground contact includes a 1-2 ground inspection plane with which the inspection instrument is to come in contact.

10. The substrate connector of claim 9, wherein the 1-1 ground inspection plane, the 1-2 ground inspection plane, the first RF inspection plane, the second RF inspection plane, the first transmission inspection planes and the second transmission inspection planes are disposed on a plane having the same height.

11. The substrate connector of claim 9, wherein the 1-1 ground inspection plane and the first transmission inspection planes are disposed on a first row which is parallel to the first axial direction, wherein the 1-2 ground inspection plane and the second transmission inspection planes are disposed on a second row which is parallel to the first axial direction, and wherein the first row and the second row are disposed to be spaced apart from each other along the second axial direction.

12. The substrate connector of claim 11, wherein the first RF inspection plane is disposed on the first row, and wherein the second RF inspection plane is disposed on the second row.

13. The substrate connector of claim 11, wherein the first RF inspection plane and the second RF inspection plane are disposed on a third row which is parallel to the first axial direction, and wherein the first row, the second row and the third row are disposed to be spaced apart from each other along the second axial direction.

14. The substrate connector of claim 1, wherein the first RF contact includes a first RF mounting member for mounting on a substrate and a first RF connecting member for connecting to an RF contact of a counterpart connector, and wherein the first RF inspection plane is formed on the first RF mounting member or the first RF connecting member.

15. The substrate connector of claim 1, wherein the first RF contact includes a first RF mounting member for mounting on a substrate, a first RF connecting member for connecting to an RF contact of a counterpart connector, and a first RF inspection member with which the inspection instrument is to come in contact.

16. The substrate connector of claim 1, wherein first transmission contacts of the transmission contacts and second transmission contacts of the transmission contacts are disposed to be spaced apart from each other along a second axial direction which is perpendicular to the first axial direction, wherein each of the first transmission contacts includes a first transfer mounting member for mounting on a substrate, a first transfer connecting member for connecting to a transmission contact of a counterpart connector, and a first transmission inspection plane with which the inspection instrument is to come in contact, and wherein the first transmission inspection plane is formed on the first transfer mounting member or the first transfer connecting member.

17. The substrate connector of claim 1, wherein first transmission contacts of the transmission contacts and second transmission contacts of the transmission contacts are disposed to be spaced apart from each other along a second axial direction which is perpendicular to the first axial direction, and wherein each of the first transmission contacts includes a first transfer mounting member for mounting on a substrate, a first transfer connecting member for connecting to a transmission contact of a counterpart connector, a first transmission inspection plane with which the inspection instrument is to come in contact, and a first transmission inspection member on which the first transmission inspection plane is formed.

18. The substrate connector of claim 1, wherein the first ground contact includes a 1-1 ground contact and a 1-2 ground contact which are disposed to be spaced apart from each other along a second axial direction which is perpendicular to the first axial direction, wherein the 1-1 ground contact includes a 1-1 ground mounting member for mounting on a substrate, a 1-1 ground connecting member for connecting to a ground contact of a counterpart connector, and a 1-1 ground inspection plane with which the inspection instrument is to come in contact, and wherein the 1-1 ground inspection plane is formed on the 1-1 ground mounting member or the 1-1 ground connecting member.

19. The substrate connector of claim 4, wherein the first ground contact includes a 1-1 ground contact and a 1-2 ground contact which are disposed to be spaced apart from each other along a second axial direction which is perpendicular to the first axial direction, and wherein the 1-1 ground contact includes a 1-1 ground mounting member for mounting on a substrate, a 1-1 ground connecting member for connecting to a ground contact of a counterpart connector, a 1-1 ground inspection plane with which the inspection instrument is to come in contact, and a 1-1 ground inspection member on which the 1-1 ground inspection plane is formed.

* * * * *